United States Patent

(12) United States Patent
Yoshimura et al.

(10) Patent No.: US 10,821,613 B2
(45) Date of Patent: Nov. 3, 2020

(54) ROBOT

(71) Applicant: Seiko Epson Corporation, Tokyo (JP)

(72) Inventors: Kazuto Yoshimura, Matsumoto (JP); Yuki Kobari, Matsumoto (JP); Sho Nakano, Matsumoto (JP)

(73) Assignee: Seiko Epson Corporation (JP)

( * ) Notice: Subject to any disclaimer, the term of this patent is extended or adjusted under 35 U.S.C. 154(b) by 246 days.

(21) Appl. No.: 15/967,901

(22) Filed: May 1, 2018

(65) Prior Publication Data
US 2018/0319022 A1  Nov. 8, 2018

(30) Foreign Application Priority Data

May 8, 2017  (JP) ................. 2017-092640

(51) Int. Cl.
*B25J 17/02* (2006.01)
*B25J 18/00* (2006.01)
*B25J 9/00* (2006.01)
*B25J 9/04* (2006.01)
*B25J 19/00* (2006.01)

(52) U.S. Cl.
CPC ......... *B25J 17/0241* (2013.01); *B25J 9/0009* (2013.01); *B25J 9/047* (2013.01); *B25J 18/00* (2013.01); *B25J 19/0029* (2013.01); *Y10S 901/23* (2013.01); *Y10S 901/28* (2013.01)

(58) Field of Classification Search
CPC .... B25J 17/0241; B25J 17/025; B25J 9/0009; B25J 9/047; B25J 9/06; B25J 19/0029; B25J 19/0025; Y10S 901/28; Y10S 901/23; Y10S 901/16; Y10T 74/20311
See application file for complete search history.

(56) References Cited

U.S. PATENT DOCUMENTS

| 3,593,952 A | * | 7/1971 | Smith ............... A61N 5/01 248/214 |
| 5,437,207 A | * | 8/1995 | Zimmer ............ B23K 11/318 414/918 |
| 9,254,575 B2 | * | 2/2016 | Murakami ......... B25J 19/0025 |
| 9,375,841 B1 | * | 6/2016 | Kemper ............ B25J 13/085 |
| 2004/0200304 A1 | * | 10/2004 | Matsumoto ........ B25J 19/0029 74/490.02 |

(Continued)

FOREIGN PATENT DOCUMENTS

| JP | 07-124886 A | 5/1995 |
| JP | 2017-080857 A | 5/2017 |

OTHER PUBLICATIONS

K-PION translation of the Description of KR 2014000910 U, Feb. 2014. (Year: 2020).*
KR 2014000910 U (Year: 2020).*

*Primary Examiner* — Daniel D Yabut
(74) *Attorney, Agent, or Firm* — Harness, Dickey & Pierce, P.L.C.

(57) ABSTRACT

A robot includes a base; a robot arm that includes an arm which is rotatable around a rotation axis with respect to the base; and a connector that is provided in the base and is capable of being connected to an external wire. The connector is located on a side of the center of gravity more than a line that is perpendicular to a location of a center of gravity of the robot arm when the robot arm is in a basic posture and a line segment passing through the rotation axis and passes through the rotation axis, as viewed from an axial direction of the rotation axis.

17 Claims, 23 Drawing Sheets

(56) References Cited

U.S. PATENT DOCUMENTS

| | | | |
|---|---|---|---|
| 2010/0313694 A1* | 12/2010 | Aoki | B25J 19/0029 |
| | | | 74/490.02 |
| 2012/0198955 A1* | 8/2012 | Hayashi | B25J 9/0009 |
| | | | 74/490.05 |
| 2016/0193731 A1* | 7/2016 | Sattler | B25J 19/06 |
| | | | 606/130 |
| 2017/0252931 A1* | 9/2017 | Zhang | B25J 17/00 |
| 2018/0104833 A1* | 4/2018 | Tanaka | B25J 18/00 |

* cited by examiner

ROBOT

BACKGROUND

1. Technical Field

The present invention relates to a robot.

2. Related Art

In the related art, an industrial robot including a robot arm and an end effector attached to a front end of the robot arm is known.

For example, JP-A-7-124886 discloses an industrial robot including a base and a robot arm rotatably provided with respect to the base. In addition, in the industrial robot, a power supply cable, which is provided on the robot arm, for supplying electric power to a motor for driving the robot arm is introduced into the base via a connector provided in the base.

Here, for example, when a robot is transported or packed, it is necessary to support a connector and a power supply cable exposed from the base, together with the robot arm. In this case, in the robot described in JP-A-7-124886, the connector and the robot arm are provided on the opposite side via the base, and thereby, it is difficult to transport and pack the entire robot, while both the robot arm and the power supply cable are supported. Accordingly, it is very troublesome to transport and pack a robot having a configuration of related art.

SUMMARY

An advantage of some aspects of the invention is to solve at least a part of the problems described above, and the invention can be implemented as the following forms or application examples.

A robot according to an application example includes a base, a robot arm that includes an arm which is rotatable around a rotation axis with respect to the base, and a connection portion that is provided in the base and is capable of being connected to an external wire, in which the connection portion is located on a side of the center of gravity more than a line that is perpendicular to a location of a center of gravity of the robot arm when the robot arm is in a basic posture and a line segment passing through the rotation axis and passes through the rotation axis, as viewed from an axial direction of the rotation axis.

According to the robot, the arm and the connection portion can be located on the same side with respect to the base, and thus, workability at the time of transportation and packing the robot can be enhanced.

In the robot according to the application example, it is preferable that the arm includes a first portion that is connected to the base so as to protrude from the base as viewed from the axial direction of the rotation axis, and a second portion that intersects with the first portion.

A location of a center of gravity of the robot arm including such an arm is easily located outside more than the base as viewed from an axial direction of a rotation axis. Accordingly, in such a robot, the arm and the connection portion can be located on the same side with respect to the base, and thus, it is possible to more remarkably achieve an effect of enhancing workability at the time of transporting and packing the robot.

It is preferable that the robot according to the application example further includes a drive unit that is disposed inside at least one of the arm and the base and drives the arm, and a wire that is disposed inside at least one of the inside of the arm and the base, and is electrically connected to the drive unit, and the wire includes a folded-back portion that is folded back on an outer circumference of the drive unit.

With this configuration, it is possible to reduce twist and fold of the wire, and to reduce damage to the wire. Accordingly, durability of the wire can be enhanced.

In the robot according to the application example, it is preferable that the base includes a grip portion attaching portion to which a grip portion is attachable.

With this configuration, the grip portion is attached to the base, and the robot can be easily transported by using the grip portion. Accordingly, it is possible to further enhance workability when the robot is transported.

In the robot according to the application example, it is preferable that the base includes a plurality of base attachment portions that are used for attaching the base to a predetermined place, and the plurality of base attachment portions are arranged on the same circular circumference around the rotation axis.

With this configuration, the base can be stably attached to a predetermined place and the base can be easily attached, and thus, for example, in a case where the arm interferes with a peripheral apparatus or the like, it is possible to easily change an installation direction of the arm so as not to interfere the arms by attaching the base again.

In the robot according to the application example, it is preferable that the robot arm includes three or more engagement member attachment portions to which an engagement member is attachable.

With this configuration, the robot can be lifted in a well-balanced manner by using an engagement member, and thus, it is possible to further enhance workability in transporting the robot.

In the robot according to the application example, it is preferable that a location of the center of gravity is located inside a shape that connects the three or more engagement member attachment portions as viewed from the axial direction of the rotation axis.

With this configuration, it is possible to lift the robot in a particularly well-balanced manner by using an engagement member.

It is preferable that the robot according to the application example further includes an illumination unit that includes a light guide plate which is provided in the robot arm and a light emitting element which emits light to the light guide plate.

With this configuration, it is possible to notify a worker, for example, that the robot is in an operable state.

In the robot according to the application example, it is preferable that the light guide plate includes a portion that protrudes an outside from an outer surface of the robot arm.

With this configuration, visibility of the illumination unit can be enhanced, and thus, it is possible for the worker to easily recognize, for example, that a robot is in an operable state.

In the robot according to the application example, it is preferable that the robot arm includes a main body portion and a cover member that is detachably attached to the main body portion, and the illumination unit is provided in the main body portion.

With this configuration, it is possible to easily route the wire or the like of the illumination unit and to easily attach the illumination unit to a robot arm.

A robot according to an application example includes a base; a robot arm that includes an arm which is rotatable around a rotation axis and is provided on the base so as to protrude from the base as viewed from an axial direction of the rotation axis; a drive unit that is provided inside at least one of the arm and the base and drives the arm; a wire that is electrically connected to the drive unit and is disposed inside the base; and a connection portion that is electrically connected to the wire, is connectable to an external wire, and is exposed on an outer surface of the base, in which the connection portion is exposed on a side where the arm protrudes with respect to the base as viewed from the axial direction of the rotation axis, when the robot arm is in a basic posture.

According to the robot, an arm and a connection portion can be located on the same side with respect to a base, and thus, it is possible to enhance workability at the time of transporting and packing the robot.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of a robot will be described in detail with reference to the accompanying drawings. In each figure, there is also a place which is enlarged or reduced appropriately so as to make the part to be described recognizable, and a place which is omitted.

In addition, in the present specification, a term "horizontal" includes a case of inclination within a range of ±5° or less with respect to horizontality. In the same manner, in the present specification, a term "vertical" includes a case of inclination within a range of ±5° or less with respect to verticality. In addition, "parallel" includes not only a case where two lines (including axes) or planes are perfectly parallel to each other but also a case where the two lines or planes are inclined within ±5° or less. In addition, in the present specification, a term "orthogonal" includes not only a case where two lines (including axes) or planes intersect with each other at an angle of 90° but also a case where the two lines or planes are inclined within ±5° or less with respect to 90°. In addition, in the present specification, a term "connection" includes a case of a direct connection and a case of an indirect connection via any member.

First Embodiment

First, a robot according to a first embodiment will be described.

Basic Configuration of Robot

Figure 1:
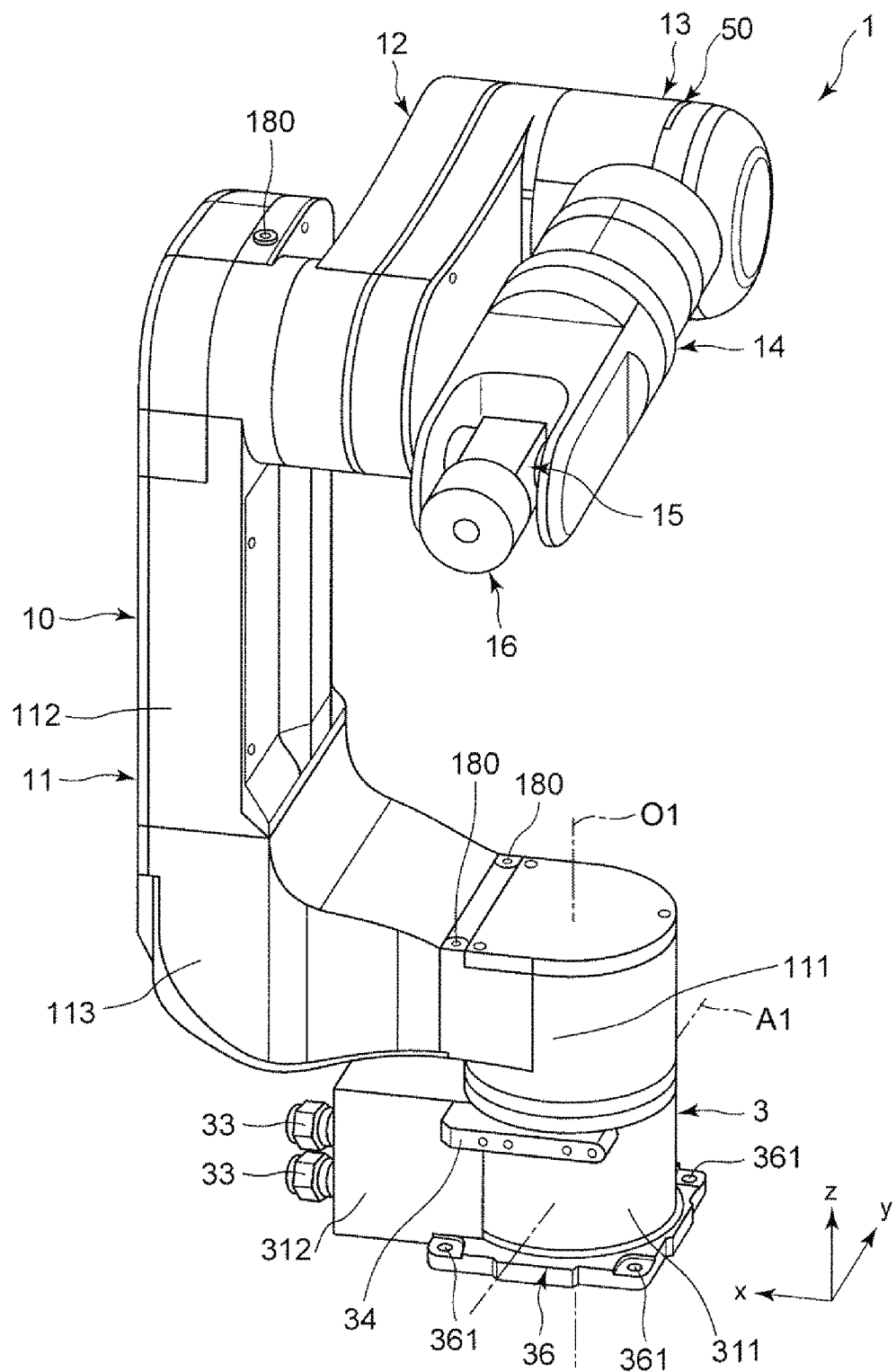
FIG. 1 is a perspective view of a robot according to a first embodiment.
Figure 2:
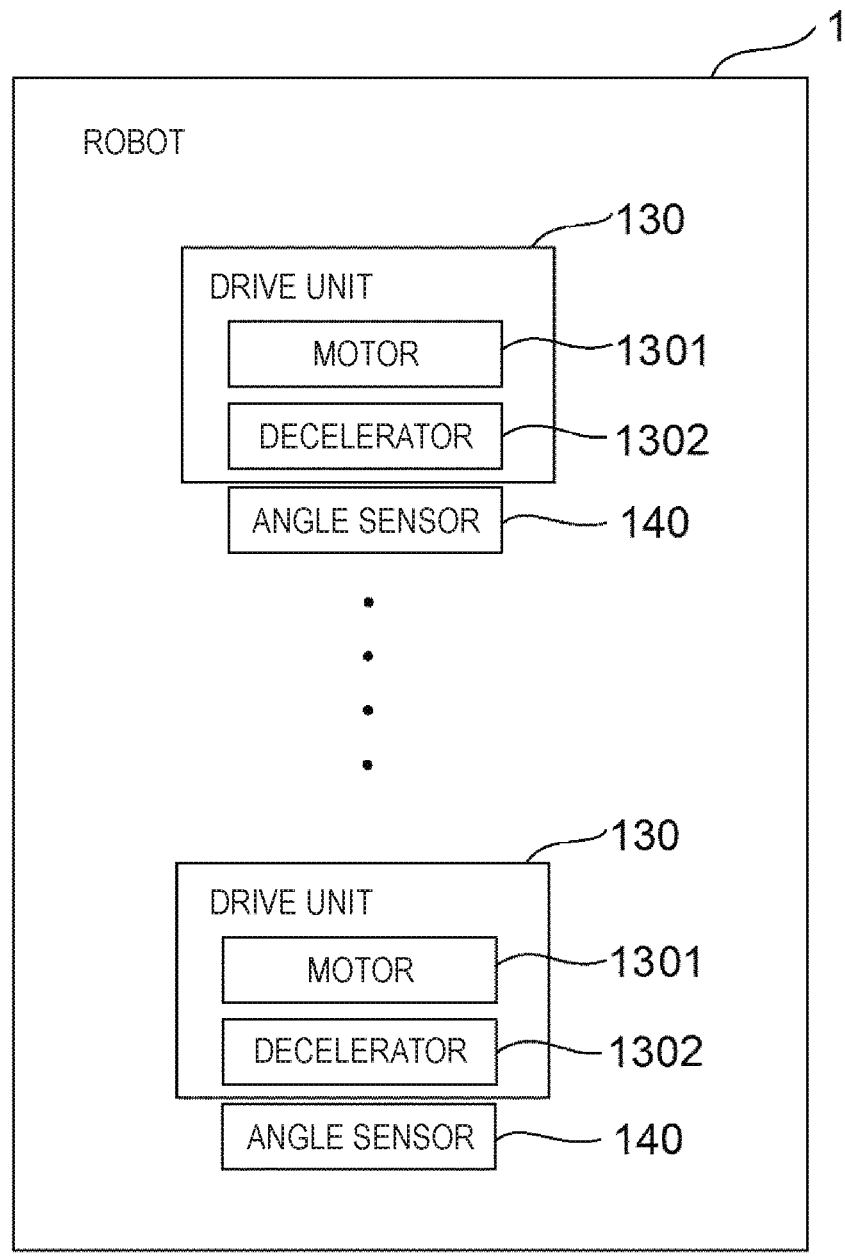
FIG. 2 is a system configuration diagram of the robot illustrated in FIG. 1.
Figure 3:
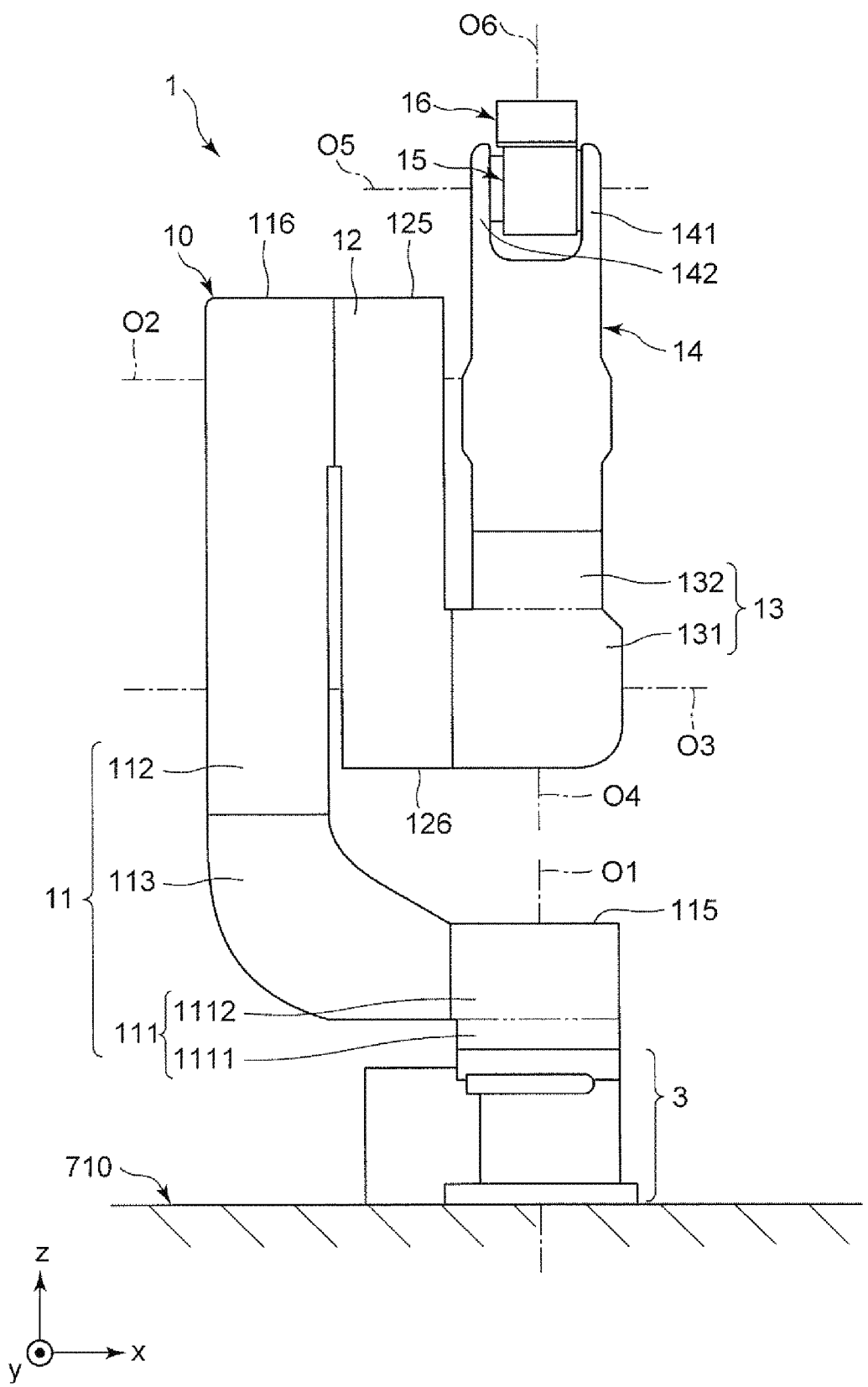
FIG. 3 is a schematic front view of the robot illustrated in FIG. 1.
Figure 4:
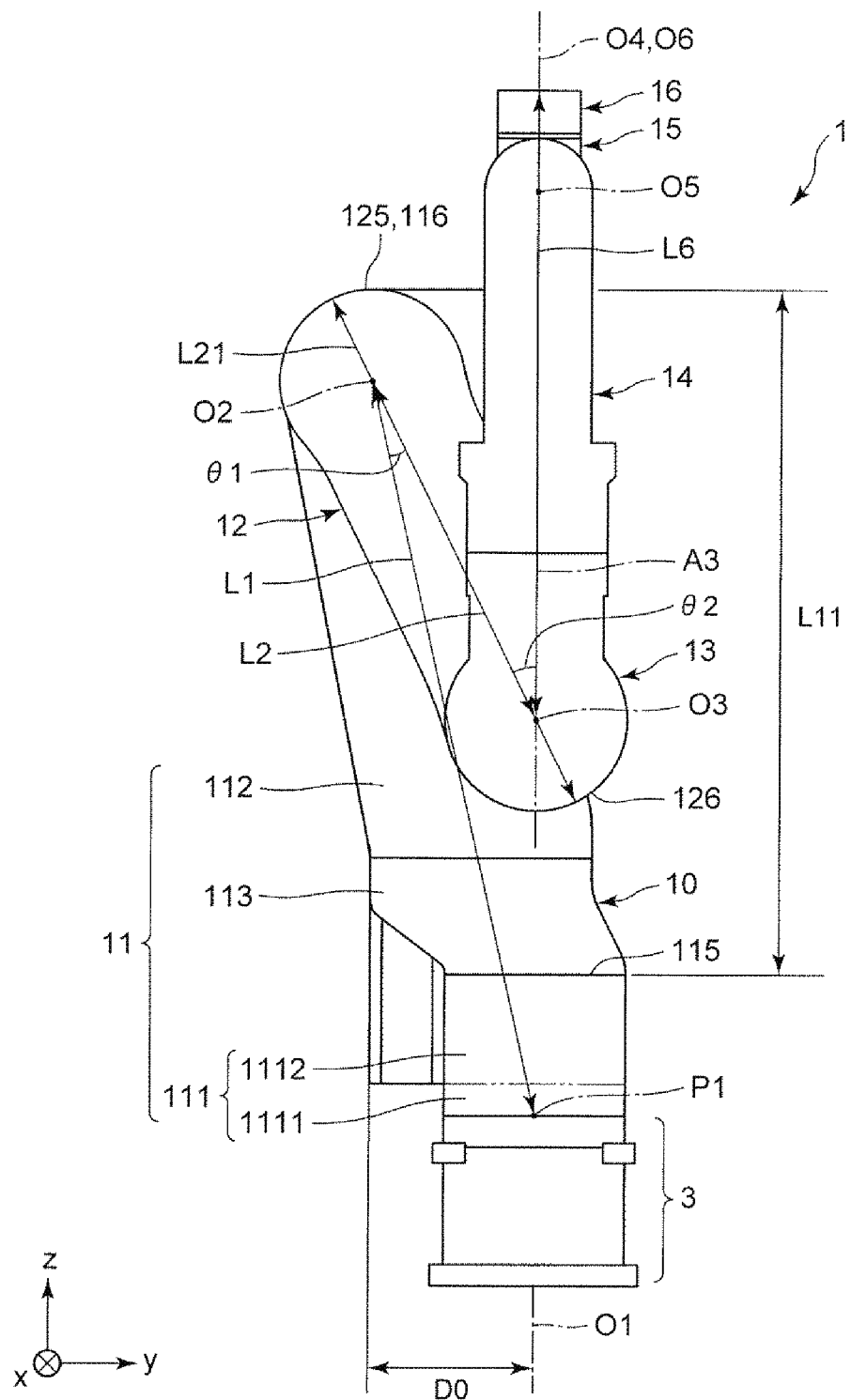
FIG. 4 is a schematic side view of the robot illustrated in FIG. 1.

FIG. 1 is a perspective view of the robot according to the first embodiment. FIG. 2 is a system configuration diagram of the robot illustrated in FIG. 1. FIG. 3 is a schematic front view of the robot illustrated in FIG. 1. FIG. 4 is a schematic side view of the robot illustrated in FIG. 1. Hereinafter, for the sake of convenient description, in each of FIGS. 1, 3, and 4, an x-axis, a y-axis, and a z-axis are illustrated as three axes orthogonal to each other, and a front end side of an arrow indicating each axis is referred to as "+" and a base end side is referred to as "−". In addition, a direction parallel to the x-axis is referred to as an "x-axis direction", a direction parallel to the y-axis is referred to as a "y-axis direction", and a direction parallel to the z-axis is referred to as a "z-axis direction". In addition, a base 3 side of a robot 1 illustrated in FIG. 1 is referred to as a "base end", and an opposite side (a sixth arm 16 side) thereof is referred to as a "front end". In addition, in FIG. 3, an upper side is referred to as "upper" and a lower side is referred to as "lower". In addition, in FIG. 3, a top-bottom direction is referred to as a "vertical direction" and a left-right direction is referred to as a "horizontal direction".

A robot 1 illustrated in FIG. 1 is a six-axis vertical articulated robot. The robot 1 can be used, for example, in a manufacturing process or the like of manufacturing a precision instrument or the like such as a wristwatch.

As illustrated in FIG. 1, the robot 1 includes a base 3, a robot arm 10 that is rotatably connected to the base 3, and an illumination unit 50. In addition, the robot 1 includes a plurality of drive units 130 and a plurality of angle sensors 140 as illustrated in FIG. 2.

While not illustrated, the robot 1 is electrically connected to a robot control device that controls drive of each unit of the robot 1. While not illustrated, the robot control device includes, for example, a central processing unit (CPU), a random access memory (RAM), a read only memory (ROM), and the like as a processor, and may be incorporated inside the robot 1 or may be provided outside the robot 1. In addition, in the present embodiment, a case where the robot 1 and the robot control device (not illustrated) are separated is described as an example, but the robot 1 may include the robot control device.

Hereinafter, configurations of each unit of the robot 1 will be described.

Base

As illustrated in FIG. 3, the base 3 is a portion fixed to a predetermined place such as a floor surface 710. Since being fixed to the floor surface 710, the base 3 is located at a lower place than the robot arm 10 in a vertical direction. That is, the robot 1 is a floor-standing vertical articulated robot. Thereby, the robot 1 is particularly excellent in workability in an upper portion and a side in an extension direction with respect to the robot 1.

In the present embodiment, the base 3 is fixed to the floor surface 710, but a fixing portion of the base 3 is not limited to the floor surface 710, and may be, for example, a ceiling, a wall, a movable truck or the like. In addition, a detailed configuration of the base 3 will be described below in detail.

Robot Arm

The robot arm 10 is rotatably supported by the base 3. The robot arm 10 includes a first arm 11, a second arm 12, a third arm 13, a fourth arm 14, a fifth arm 15, and a sixth arm 16 (six arms). The first arm 11, the second arm 12, the third arm 13, the fourth arm 14, the fifth arm 15, and the sixth arm 16 are connected in this order from a base end side to a front end side.

The first arm 11 has a bent shape as viewed from the front of paper of FIG. 3. In addition, as illustrated in FIG. 4, the first arm 11 has a portion inclined with respect to a first rotation axis O1 to be described below.

As illustrated in FIGS. 3 and 4, the first arm 11 includes a first portion 111 connected to the base 3, a second portion 112 connected to the second arm 12, and a third portion 113 connecting the first portion 111 to the second portion 112. The first portion 111, the second portion 112, and the third portion 113 are integrally formed.

The first portion 111 includes a portion 1111 extending from the base 3 in the vertical direction and a portion 1112 extending from the portion 1111 toward a middle left side in FIG. 3 in the horizontal direction (first direction). Thereby, a space is provided between the base 3 and the portion 1112. In addition, as illustrated in FIG. 4, the second portion 112 includes a shape extending in a direction (direction different from the first direction) different from both the horizontal direction and the vertical direction. In addition, the second portion 112 intersects the portion 1112 of the first portion 111 as viewed from the front of paper of FIG. 3, and particularly, orthogonal in the present embodiment. In addition, as illustrated in FIG. 3, the third portion 113 is inclined in a direction far away from the first portion 111 from an end portion on a side opposite to a connection portion of the first portion 111 connected to the base 3 and extends toward an upper side above the first portion 111. The third portion 113 is inclined in a direction (direction different from the first direction and the second direction) different from each extending direction of the first portion 111 and the second portion 112 described above.

As illustrated in FIG. 3, the second arm 12 has an elongated shape and is connected to a front end portion of the first arm 11.

The third arm 13 has an elongated shape and is connected to an end portion of the second arm 12 opposite to the end portion connected to the first arm 11. The third arm 13 is connected to the second arm 12 in a posture illustrated in FIG. 3 and includes a portion 131 extending from the second arm 12 in the horizontal direction and a portion 132 extending from the portion 131 in the vertical direction. The portions 131 and 132 may be integrally formed or may be formed separately.

The fourth arm 14 is connected to an end portion of the third arm 13 opposite to the end portion connected to the second arm 12. The fourth arm 14 includes a pair of support portions 141 and 142 facing each other. The support portions 141 and 142 are used for connection to the fifth arm 15. Either one of the support portions 141 and 142 may be omitted. That is, a configuration is provided in which the fourth arm 14 supports the fifth arm 15 in a cantilever manner.

The fifth arm 15 is located between the support portions 141 and 142 and is connected to the fourth arm 14 by being connected to the support portions 141 and 142.

The sixth arm 16 is connected to a front end portion of the fifth arm 15. While not illustrated, a front end of the sixth arm 16 is configured such that an end effector that, for example, grips, adsorbs, or the like a work target of the robot 1 can be attached thereto. A hand having a plurality of finger portions (fingers) can be used as the end effector.

In addition, while not illustrated in detail, each of the above-described arms 11 to 15 is configured with a main body portion and a cover member attached to the main body portion (see FIG. 1). Each of the arms 11 to 15 has an internal space in which the drive unit 130 and the like are disposed by attaching a cover member to the main body portion. That is, each of the arms 11 to 15 has a portion of a hollow shape in which the drive unit 130 and the like can be disposed. In addition, the sixth arm 16 described above has a columnar shape having a through-hole (internal space) in the central portion, and a wire and the like can be disposed in the through-hole.

In addition, as illustrated in FIG. 3, the robot 1 is configured such that one arm can rotate with respect to the other arm (or the base 3). Specifically, the base 3 and the first arm 11 are connected to each other via a joint, and the first arm 11 is rotatable with respect to the base 3 around the first rotation axis O1 in the vertical direction. In addition, the first arm 11 and the second arm 12 are connected to each other via a joint, and the second arm 12 is rotatable with respect to the first arm 11 around a second rotation axis O2 in the horizontal direction. In addition, the second arm 12 and the third arm 13 are connected to each other via a joint, and the third arm 13 is rotatable with respect to the second arm 12 around a third rotation axis O3 in the horizontal direction. In addition, the third arm 13 and the fourth arm 14 are connected to each other via a joint, and the fourth arm 14 is rotatable with respect to the third arm 13 around a fourth rotation axis O4 orthogonal to the third rotation axis O3. In addition, the fourth arm 14 and the fifth arm 15 are connected to each other via a joint, and the fifth arm 15 is rotatable with respect to the fourth arm 14 around a fifth rotation axis O5 orthogonal to the fourth rotation axis O4. In addition, the fifth arm 15 and the sixth arm 16 are connected to each other via a joint, and the sixth arm 16 is rotatable with respect to the fifth arm 15 around a sixth rotation axis O6 orthogonal to the fifth rotation axis O5.

In addition, the robot arm 10 having such a configuration includes a plurality of engagement member attachment portions 180 used for lifting and transporting the robot 1. The plurality of engagement member attachment portions 180 will be described below in detail.

Illumination Unit

As illustrated in FIG. 1, the robot arm 10 is provided with the illumination unit 50 for notifying that the robot 1 is in an operable state. The illumination unit 50 will be described below in detail.

Drive Unit

As illustrated in FIG. 2, the robot 1 includes a plurality of drive units 130 that rotate one arm with respect to the other arm (or the base 3). The drive unit 130 is configured by an apparatus that converts power for rotating a corresponding arm into mechanical energy. For example, the drive unit 130 includes a motor 1301 and a decelerator 1302. While not illustrated, the plurality of drive units 130 are provided in the respective corresponding arms 11 to 16 or in the vicinity thereof. Thus, in the present embodiment, the robot 1 includes the same number (six in the present embodiment) of drive units 130 as the arms 11 to 16. In addition, each of the drive units 130 is electrically connected to a motor driver included in a robot control device (not illustrated), and each of the drive units 130 is controlled by the robot control device via the motor driver. The motor driver may be an element included in the robot 1.

Angle Sensor

As illustrated in FIG. 2, each of the drive units 130 is provided with an angle sensor 140 such as a rotary encoder. In the present embodiment, the robot 1 includes the same number (six in the present embodiment) of angle sensors 140 as the drive units 130. Thereby, it is possible to detect a rotation angle of a rotation axis (not illustrated) of the motor 1301 or the decelerator 1302 included in each of the drive units 130.

As described above, the basic configuration of the robot 1 is described. As described above, the robot 1 having such a configuration is a vertical articulated robot including six (plural) arms 11 to 16, and thus, the robot has a wide drive range and can achieve high workability.

In addition, in the present embodiment, the number of arms included in the robot 1 is six, and the number of arms may be 1 to 5 or may be 7 or more. However, it is preferable that, in order to precisely locate the end effector provided at the front end of the robot arm 10 at an intended place in a three-dimensional space, the number of arms (the number of rotation axes) has to be at least six.

In the present embodiment, the respective arms 11 to 16 are rotatable with respect to adjacent arms or the base 3, but the robot arm 10 may have an arm which is translated with respect to adjacent arms or the base 3. In this case, a position sensor configured by a linear encoder can be used instead of the angle sensor 140.

In addition, the robot 1 may include a force sensor for detecting contact or the like with, for example, a work target object.

Detailed Configuration of Robot Arm

Next, a detailed configuration and the like of the robot arm 10 will be described.

Figure 5:
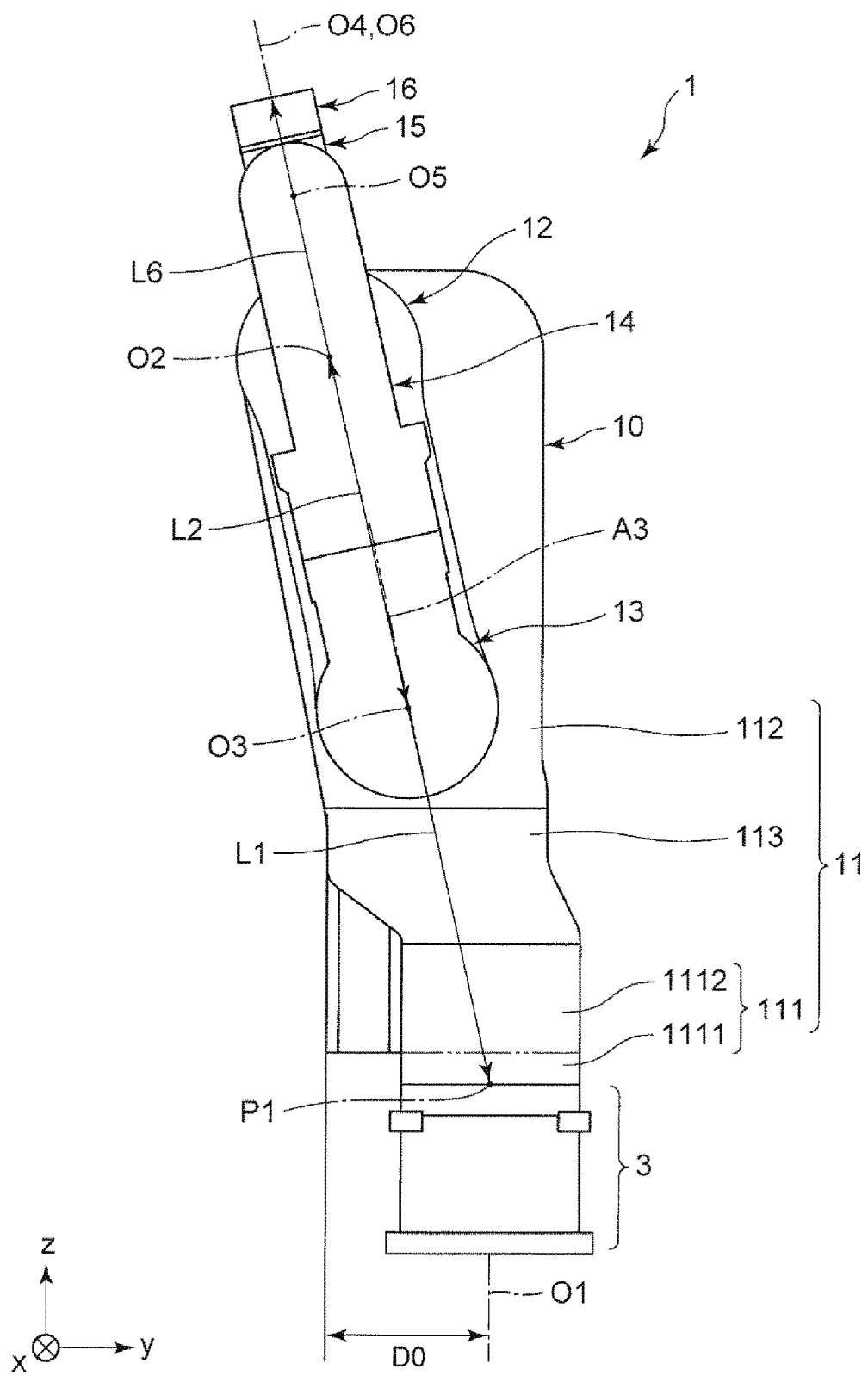
FIG. 5 is a schematic side view illustrating a state where a first arm, a second arm, and a third arm of the robot illustrated in FIG. 1 overlap each other.
Figure 6:
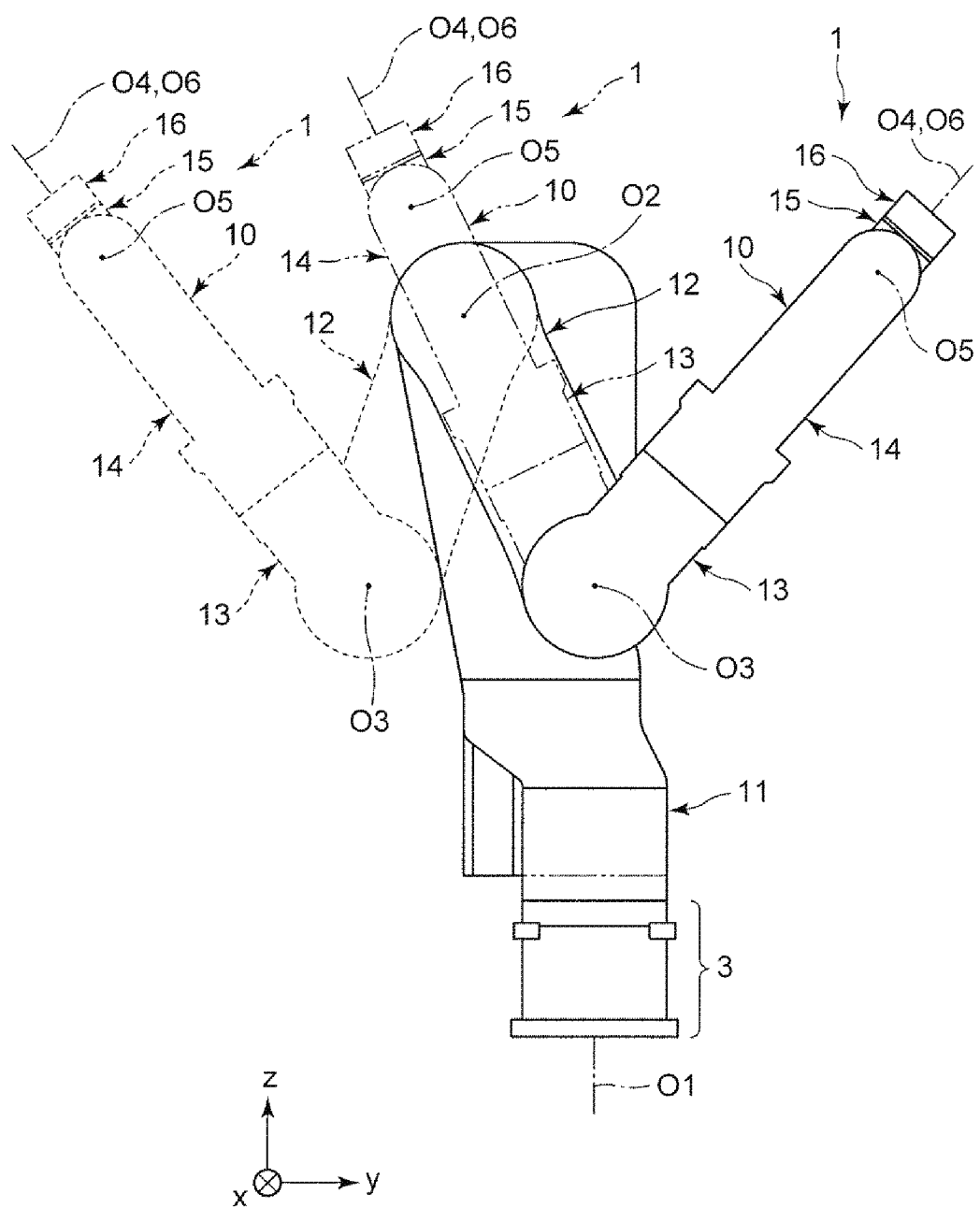
FIG. 6 is a view illustrating an example of an operation of a robot arm included in the robot illustrated in FIG. 1.
Figure 7:
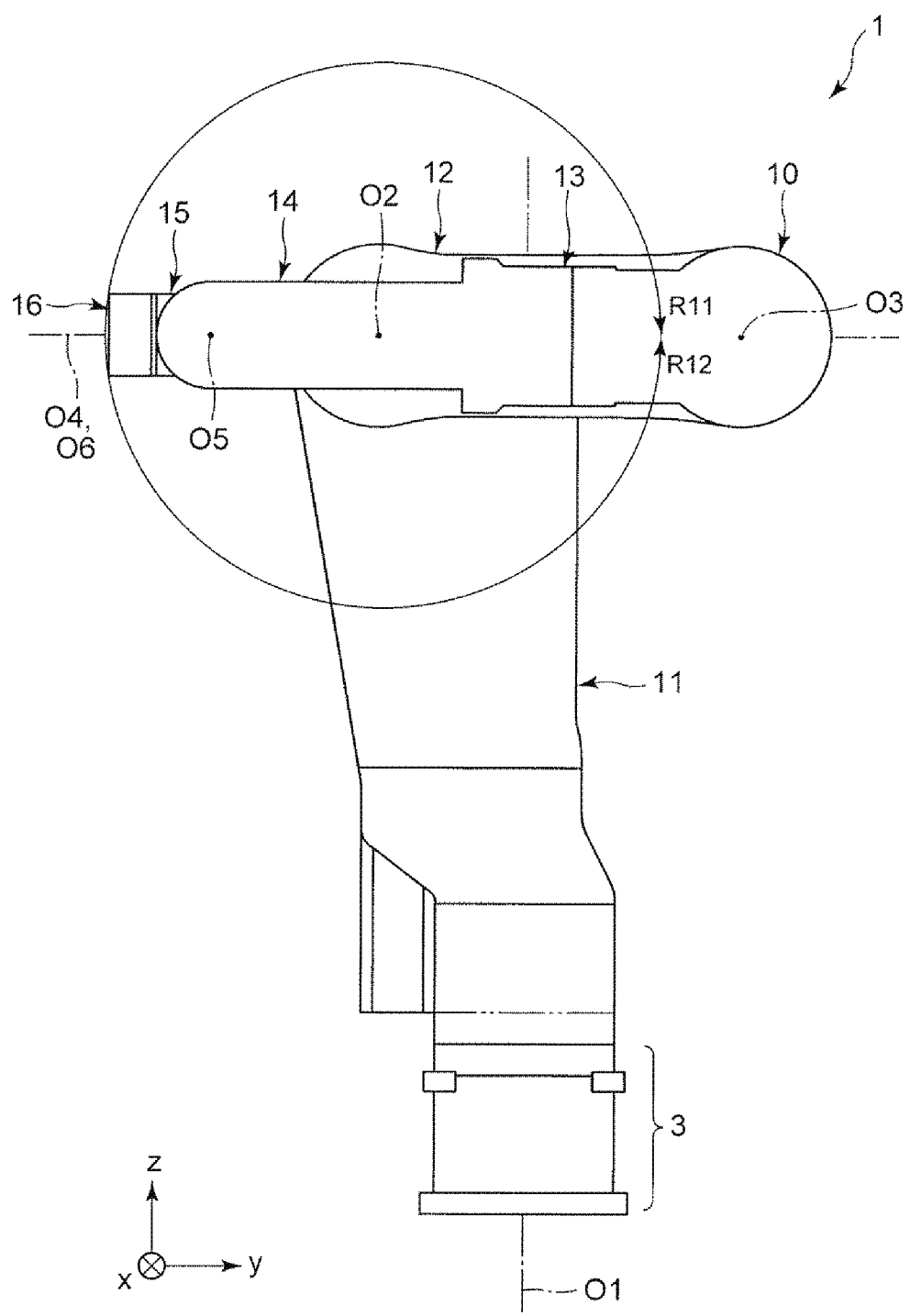
FIG. 7 is a schematic side view illustrating a basic posture of the robot arm included in the robot illustrated in FIG. 1.
Figure 8:
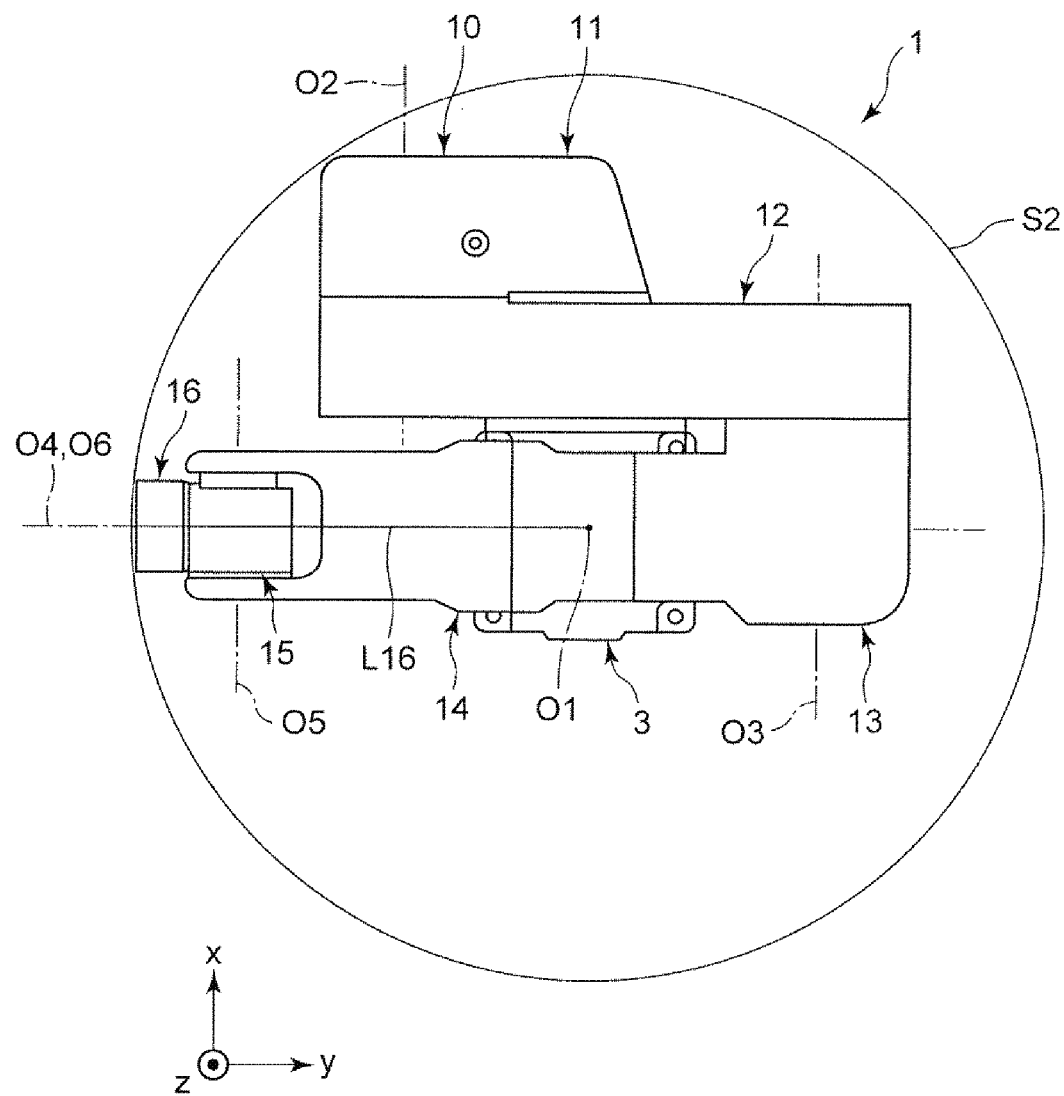
FIG. 8 is a schematic top view illustrating a basic posture of the robot arm included in the robot illustrated in FIG. 1.

FIG. 5 is a schematic side view illustrating a state where the first arm, the second arm, and the third arm of the robot illustrated in FIG. 1 overlap each other. FIG. 6 is a view illustrating an example of an operation of the robot arm included in the robot illustrated in FIG. 1. FIG. 7 is a schematic side view illustrating a basic posture of the robot arm included in the robot illustrated in FIG. 1. FIG. 8 is a schematic top view illustrating the basic posture of the robot arm included in the robot illustrated in FIG. 1.

Relationship Between First Arm and Second Arm

A length of the first arm 11 is longer than a length of the second arm 12 (see FIGS. 4 and 5). Here, the length of the first arm 11 is a length of the line segment L1 connecting the second rotation axis O2 to a point P1 as viewed from an axial direction of the second rotation axis O2. The point P1 is a portion (point) where a connection surface (connection portion) between the first arm 11 and the base 3 intersects with the first rotation axis O1. In addition, a length of the second arm 12 is a length of a line segment L2 connecting the second rotation axis O2 to the third rotation axis O3 as viewed from an axial direction of the second rotation axis O2.

In addition, when viewed from the second rotation axis O2, a length L11 between a front end surface 116 of the first arm 11 and an upper surface 115 (a surface on a side opposite to a connection surface with the base 3) of the first portion 111 of the first arm 11 is longer than a length L21 from a base end surface 125 to a front end surface 126 of the second arm 12.

In addition, the robot 1 is configured such that an angle $\theta 1$ between the first arm 11 and the second arm 12 can be set to 0° as viewed from an axial direction of the second rotation axis O2 (see FIG. 5 and FIG. 6). That is, as illustrated in FIG. 5, the robot 1 is configured such that the first arm 11 and the second arm 12 can overlap without interfering with each other as viewed from the axial direction of the second rotation axis O2. Here, the angle $\theta 1$ is an angle between the line segment L1 and the line segment L2 as viewed from the second rotation axis O2.

Relationship Between Second Arm and Third Arm

The robot 1 is configured such that an angle $\theta 2$ between the line segment L2 (or a central axis of the second arm 12) and a central axis A3 of the third arm 13 when viewed from the axial direction of the second rotation axis O2 is set to 0° (See FIG. 4 and FIG. 5). That is, as illustrated in FIG. 5, the robot 1 is configured such that the second arm 12 and the third arm 13 can overlap when viewed from the axial direction of the second rotation axis O2.

Thus, in the robot 1, the first arm 11, the second arm 12, and the third arm 13 can simultaneously overlap with one another when viewed from the axial direction of the second rotation axis O2. Accordingly, the robot 1 can change a posture of the robot arm 10 from a state indicated by a solid line of FIG. 6 to a state indicated by a dashed line of FIG. 6 through a state indicated by a two-point chain line of FIG. 6. As such, the robot 1 can move the front end of the robot arm 10 to a position different by 180° around the first rotation axis O1 without rotating the first arm 11. In this movement, the front end of the robot arm 10 moves linearly as viewed from the axial direction of the first rotation axis O1. As such, since the front end of the robot arm 10 can be moved linearly as viewed from the axial direction of the first rotation axis O1, it is possible to reduce a space for preventing each unit of the robot 1 from interfering with each other. Therefore, even if the robot 1 is in a relatively narrow space, various works can be performed efficiently while avoiding interference with the peripheral devices of the robot arm 10. In addition, since the space for preventing each unit of the robot arm 10 from interfering can be reduced, the number of evacuation points to be taught can be reduced, and thus, labor and time required for teaching can be reduced.

Total Length of Third Arm, Fourth Arm, Fifth Arm, and Sixth Arm

A total length L6 of the third arm 13, the fourth arm 14, the fifth arm 15, and the sixth arm 16 is set to be longer than the length (line segment L2) of the second arm 12 (see FIG. 4 and FIG. 5). Here, a length L6 is a distance between the third rotation axis O3 and a front end surface of the sixth arm 16 as viewed from the axial direction of the second rotation axis O2. As illustrated in FIG. 5, a length L6 is a length in a state where the fourth rotation axis O4 and the sixth rotation axis O6 coincide with each other. Since the total length L6 is set to be longer than the length (line segment L2) of the second arm 12, the front end of the robot arm 10 can protrude upward from the second arm 12 in a state where the arms 12 to 14 are overlapped when viewed from the axial direction of the second rotation axis O2. Thereby, it is possible to prevent an end effector (not illustrated) attached to the sixth arm 16 from interfering with the first arm 11 and the second arm 12.

Location Relationship Between First Rotation Axis and Second Rotation Axis

The first rotation axis O1 and the second rotation axis O2 are in a location of twist. In addition, as illustrated in FIG. 5, the second rotation axis O2 is separated from the first rotation axis O1 by a distance DO when viewed from the axial direction of the second rotation axis O2. Accordingly, it is possible to perform particularly easy access to a region on the left side and a region (region on a base side) on the lower left side of the robot 1, in addition to the upper region of the robot 1.

In addition, in the present embodiment, a width of the second portion 112 of the first arm 11 as viewed from the second rotation axis O2 increases from the base end side to the front end side. In addition, in the present embodiment, a side surface of the second portion 112 on the middle left side in FIG. 5 is inclined with respect to the vertical direction when viewed from the axial direction of the second rotation axis O2, whereas a side surface of the second portion 112 on the middle right side of FIG. 5 is parallel to the vertical direction. By forming the second portion 112 in such a shape, a geometric center of gravity (or a center of gravity G1 of the robot arm 10 illustrated in FIG. 11) of the first arm 11 as viewed from the axial direction of the second rotation axis O2 can be located on a side of the first rotation axis O1. Thereby, as described above, since the second rotation axis O2 is separated from the first rotation axis O1 by the distance DO, it is possible to reduce a possibility that the robot arm 10 is easily inclined toward the second rotation axis O2 side as viewed from the axial direction of the second rotation axis O2.

Basic Posture of Robot Arm and Movable Range of Front End of Robot Arm

As illustrated in FIG. 7, it is possible to take a state where the second arm 12 and the third arm 13 overlap each other and the line segment L2 is orthogonal to the first rotation axis O1, when viewed from the axial direction of the second rotation axis O2, in the robot 1. In the present embodiment, the posture of the robot arm 10 in a state illustrated in FIGS. 1 and 7 is referred to as a "basic posture (first posture)". The basic posture indicates a posture of the robot arm 10 when each angle sensor 140 is in an original point (see FIGS. 1 and 2). The fact that each angle sensor 140 is the original point means that the angle sensor 140 represents 0 degrees.

In addition, in the present embodiment, the robot 1 is set so as to capable of rotating the front end of the robot arm 10 by 180° in the direction of an arrow R11 and the direction of an arrow R12 in FIG. 7 by rotating the second rotation axis O2 from the basic posture. Accordingly, the robot 1 can perform particularly easy access to the upper region, the left region, and the lower left region (region on the base side) of the robot 1. The rotation range is arbitrary without being limited to 180°.

In addition, as illustrated in FIG. 8, the robot 1 rotates the first rotation axis O1 from the basic posture, thereby, being able to move the front end of the robot arm 10 along a virtual circle S2 in a state where the entire region of the robot arm 10 is located within the virtual circle S2 as viewed from the axial direction of the first rotation axis O1. The virtual circle S2 is a circle in which a length of a line segment L16 connecting the front end of the robot arm 10 to the first rotation axis O1 is set as a radius and the first rotation axis O1 is set as the center, as viewed from the axial direction of the first rotation axis O1. The line segment L16 is a length in a state where the fourth rotation axis O4 and the sixth rotation axis O6 coincide with each other.

As such, in the robot 1, since the front end of the robot arm 10 can be moved in a circular shape as viewed from a predetermined direction, a movable range of the front end of the robot arm 10 is easily grasped, and thus, it is possible to easily set a layout of the robot 1, a peripheral device, and the like.

Detailed Configuration of Base and Wire

Next, detailed configurations and the like of the base 3 and a plurality of wires 170 located in the base 3 and the robot arm 10 will be described.

Figure 9:
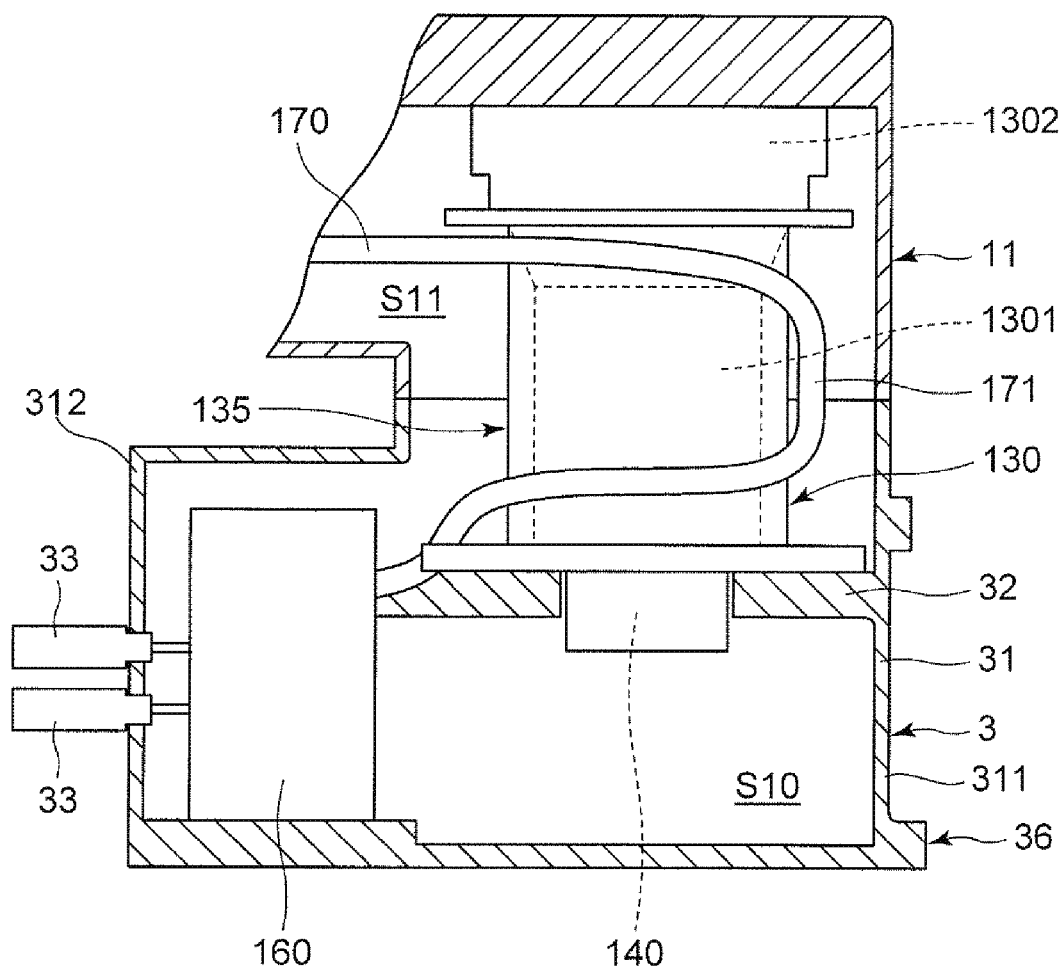
FIG. 9 is a schematic front view illustrating an inside of a base of the robot illustrated in FIG. 1.
Figure 10:
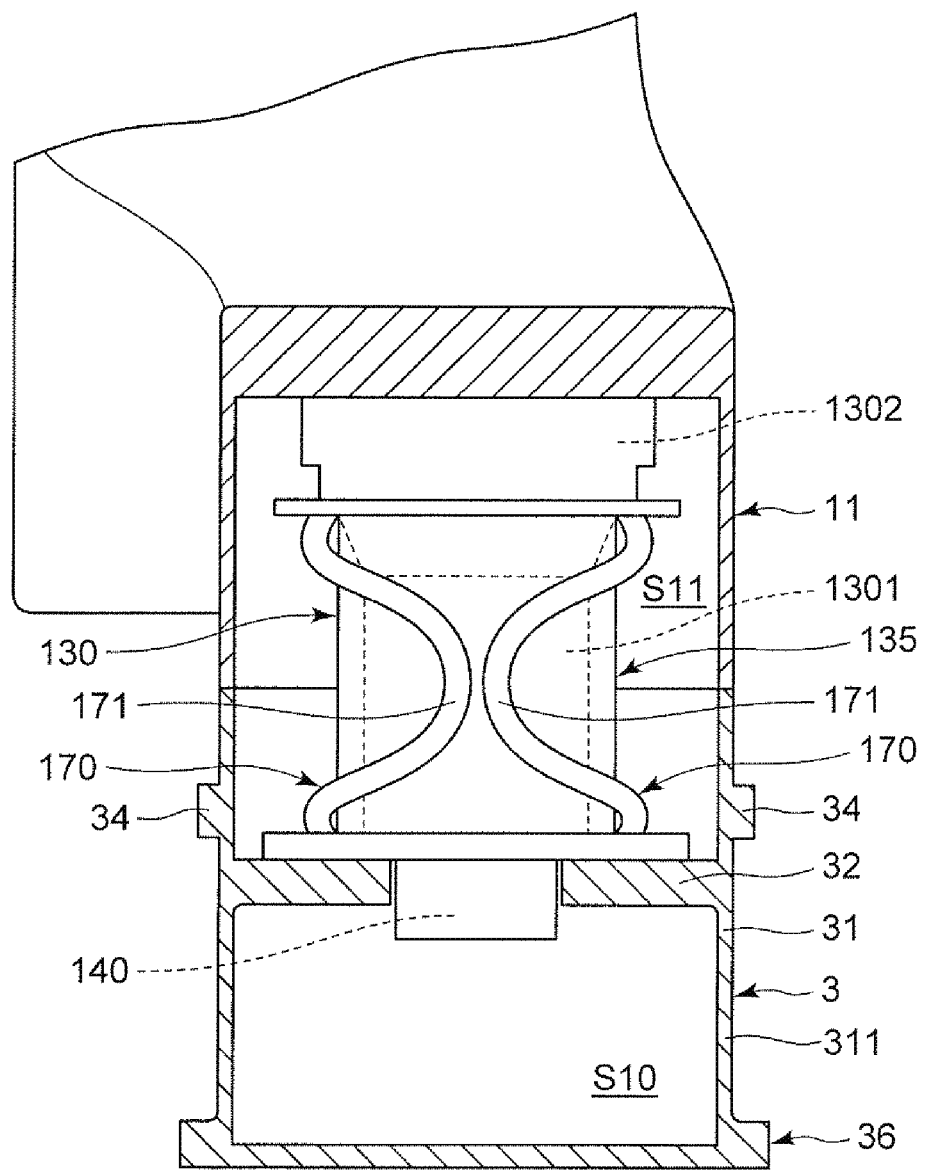
FIG. 10 is a schematic side view illustrating the inside of the base of the robot illustrated in FIG. 1.
Figure 11:
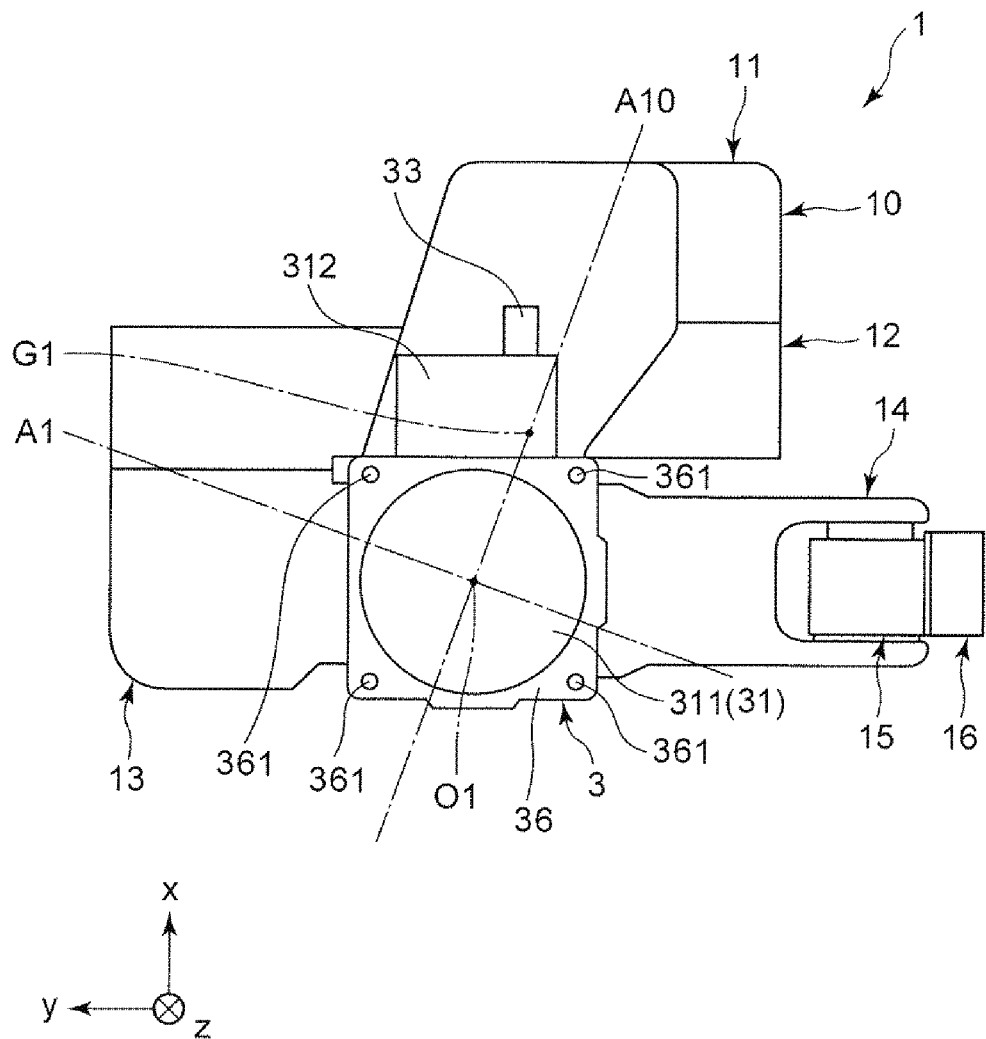
FIG. 11 is a schematic bottom view of the robot illustrated in FIG. 1.

FIG. 9 is a schematic front view illustrating the inside of the base of the robot illustrated in FIG. 1. FIG. 10 is a schematic side view illustrating the inside of the base of the robot illustrated in FIG. 1. FIG. 11 is a schematic bottom view of the robot illustrated in FIG. 1.

The base 3 is a hollow member and includes a housing 31, a support member 32 that is disposed in the housing 31 and supports the drive unit 130, a plurality of grip portion attaching portions 34 provided on an outer surface of the housing 31, a plurality of connectors 33 provided on the outer surface of the housing 31, and a base attachment member 36 for attaching the base 3 to the floor surface 710 (see FIGS. 1, 3, 9 and 10). The housing 31, the support member 32, the grip portion attaching portions 34, and the base attachment member 36 are integrally formed, but may be formed as separate bodies.

Case

The housing 31 includes a part of the drive unit 130 relating to driving of the first arm 11, and an internal space S10 in which various components such as a relay substrate 160 and the wires 170 can be disposed. The internal space S10 communicates with an internal space S11 of the first arm 11. In addition, in the present embodiment, the housing 31 is located below the first arm 11 and includes a cylindrical portion 311 connected to the first arm 11 and a portion 312 protruding on the left side of FIG. 9 from the portion 311.

Support Member

The support member 32 is located inside the portion 311 of the housing 31 and protrudes from the portion 311 toward a central portion of the internal space S10. Here, the drive unit 130 located in the first arm 11 and the base 3 includes a motor 1301, a decelerator 1302, and a case 135 that houses the motor and the decelerator. In addition, a member including an angle sensor 140 is attached to a lower portion of the drive unit 130.

In the present embodiment, the support member 32 is approximately annular. The drive unit 130 is placed on the support member 32 such that the angle sensor 140 is located inside a ring of the support member 32. By doing so, the support member 32 supports the drive unit 130 and the angle sensor 140.

A configuration of the support member 32 is not limited to the illustrated configuration, and any configuration may be used as long as at least the drive unit 130 can be supported.

Grip Portion Attaching Portion

As illustrated in FIG. 10, the plurality (two in the present embodiment) of grip portion attaching portions 34 are provided so as to face each other with the portion 311 of the housing 31 interposed therebetween. In the present embodiment, each of the two grip portion attaching portions 34 has an elongated shape in the x-axis direction (see FIG. 1). In addition, the two grip portion attaching portions 34 are provided on the +y-axis side and the −y-axis side of the portion 311, and protrude from an outer surface of the portion 311 toward the outside.

The grip portion attaching portion 34 is a portion to which a grip portion (not illustrated) used when the robot 1 is lifted by a worker is attached. The grip portion attaching portion 34 includes a plurality of female screw holes penetrating in the horizontal direction. Any grip portion can be fixed to the grip portion attaching portion 34 by screwing using the female screw hole. The method for attaching the grip portion to the grip portion attaching portion 34 is not limited to this, and may be performed by, for example, pinning or the like.

As such, the base 3 includes a grip portion attaching portion 34 to which a grip portion (not illustrated) can be attached. Thereby, by attaching the grip portion (not illustrated) to the grip portion attaching portion 34, a worker can grip the grip portion to lift or move the robot 1. Accordingly, the worker can easily transport the robot 1 by using the grip portion (not illustrated), and thereby, it is possible to enhance workability at the time of transporting the robot 1. In addition, since the grip portion attaching portion 34 is provided on the base 3, the worker can perform stable transport or the like of the robot 1 as compared with a case where the grip portion attaching portion is provided on the robot arm 10.

In addition, the grip portion attached to the grip portion attaching portion 34 can also be used as a fixing portion for fixing, for example, the base 3 to a predetermined place. That is, in the present embodiment, a lower surface of the base 3 is fixed to the floor surface 710 (see FIG. 3), but the grip portion attached to the grip portion attaching portion 34 may be attached to any installation place other than the floor surface 710.

In the present embodiment, the grip portion attaching portion 34 is provided on the base 3, but may be provided on, for example, the first arm 11 or the like. In addition, in the drawing, the grip portion attaching portion 34 has an elongated shape in the x-axis direction, but any configuration may be used without being limited to the illustrated configuration as long as a configuration in which a grip portion can be attached is provided. In addition, the number of the grip portion attaching portions 34 is not limited to two and may be one or three or larger.

In addition, the grip portion attaching portion 34 and the above-described support member 32 are connected to each other via apart of the portion 311. In addition, as described above, the grip portion attaching portion 34, the support member 32, and the portion 311 are integrally formed. Accordingly, the support member 32, the portion 311, and the grip portion attaching portion 34 function as a heat dissipation member for dissipating heat generated by driving the motor 1301 of the drive unit 130 to the outside. By including the portion functioning as the heat dissipation member in the base 3, the heat of the drive unit 130 can be dissipated, and a possibility of thermal runaway of the drive unit 130 can be reduced.

Connector

As illustrated in FIG. 9, a plurality (two in the present embodiment) of connectors 33 are provided in a portion 312 of the housing 31. In addition, in the present embodiment, the connectors 33 are exposed on the +x-axis side of the portion 312 so as to protrude from an outer surface of the portion 312 toward the outside. The connectors 33 are electrically connected to a relay substrate 160 that aggregates a plurality of wires 170 connected to each angle sensor 140. In addition, while not illustrated, an external wire electrically connected to a robot control device can be connected to the connector 33. That is, the connector 33 electrically connects the wire 170 connected to the relay substrate 160 located inside the robot 1 to the external wire.

Here, as described above, the robot 1 includes the base 3 and the robot arm 10 including the first arm 11 (arm) which is rotatable around the first rotation axis O1 (rotation axis) with respect to the base 3 and is provided on the base 3 so as to protrude from the base 3 as viewed from the axial direction of the first rotation axis O1. In addition, the robot 1 includes the drive unit 130 provided in at least one of the first arm 11 and the base 3, both in the present embodiment, and driving the first arm 11, a wire 170 electrically connected to the drive unit 130 and disposed inside the base 3, and the connectors 33 (connection portions) electrically connected to the wire 170 and connectable to external wires (not illustrated) and exposed on an outer surface of the base 3. When the robot arm 10 is in a basic posture, the connector 33s are exposed on a side (+x-axis direction) where the first arm 11 protrudes with respect to the base 3 as viewed from the axial direction of the first rotation axis O1 (see FIG. 1). That is, the robot arm 10 can take a posture in which the first arm 11 protrudes, on the side where the connector 33 is exposed. As described above, the basic posture indicates a posture of the robot arm 10 in the state illustrated in FIG. 1 or 7.

In other words, the robot 1 includes the base 3, the robot arm 10 including the first arm 11 (arm) rotatable around the first rotation axis O1 (rotation axis) with respect to the base 3, and the connectors 33 (connection portions) provided in the base 3 and capable of connecting an external wire (not illustrated). The first arm 11 (arm) is an arm on the base end side closest to the base 3. In addition, the first rotation axis O1 (rotation axis) is a rotation axis of the first arm 11 closest to the base end side, that is, can also be said to be a rotation axis of the robot arm 10. As illustrated in FIGS. 1 and 11, as viewed from the axial direction of the first rotation axis O1, the connector 33 (connection portion) is perpendicular to a location of the center of gravity G1 of the robot arm 10 when the robot arm 10 is in the basic posture and a line segment A10 passing through the first rotation axis O1, and is located on the center of gravity G1 side more than a line A1 passing through the first rotation axis O1.

According to the robot 1, the first arm 11 and the connector 33 (connection portion) can be located on the same side with respect to the base 3. Accordingly, it is possible to collectively support the first arm 11, the connector 33, and the external wire. Therefore, it is possible to enhance workability when the robot 1 is transported and packed.

In addition, as described above, the first arm 11 (arm) includes the first portion 111 connected to the base 3 so as to protrude from the base 3 in the +x-axis direction as viewed from the axial direction of the first rotation axis O1, and the second portion 112 intersecting the first portion 111.

The center of gravity G1 of the robot arm 10 including the first arm 11 is easily located the outside more than the base 3 as viewed from the axial direction of the first rotation axis O1. Accordingly, in the robot 1 including the first arm 11, the first portion 111 and the connector 33 are located on the same side with respect to the base 3, and thereby, the first arm 11, the connector 33, and the external wire are supported easily and collectively, and the robot 1 is easily balanced when being transported. Therefore, it is possible to further enhance workability when the robot 1 is transported or the like.

Wire

The plurality of wires 170 are routed inside the robot arm 10, and are electrically connected to the angle sensors 140, the drive unit 130, and the like.

Each of the plurality of wires 170 has a folded-back portion 171 disposed in an outer circumference of the motor 1301 (drive unit 130). The folded-back portion 171 is a portion that is disposed to be folded back in a circumferential direction of a rotation axis (not illustrated) disposed in the z-axis direction of the motor 1301 and is U-shaped.

As such, the robot 1 includes the drive unit 130 that is disposed inside at least one of the first arm 11 (arm) and the base 3, both in the present embodiment, and drives the first arm 11, and the wire 170 that is disposed inside at at least one of the first arm 11 (arm) and the base 3, both in the present embodiment, and is electrically connected to the drive unit 130. The wire 170 includes the folded-back portion 171 folded back on the outer circumference of the drive unit 130. More specifically, the folded-back portion 171 of the wire 170 is routed along the outer circumference of the motor 1301 from an end portion on the first arm 11 side, and thereafter, is folded back to be turned back so as to be turned back and is connected to an end portion on the base 3 side. While not illustrated, the end portion (one end portion) of the folded-back portion 171 on the first arm 11 side is fixed to a member rotatable together with the rotation axis of the motor 1301 by a clamp, and the end portion (the other end portion) on the base 3 side is fixed to a member fixed to the motor 1301 by a clamp.

As such, since the wire 170 has the folded-back portion 171, if the rotation axis of the motor 1301 rotates, the end portion of the folded-back portion 171 on the base 3 side is not displaced and the end portion on the first arm 11 side of the folded-back portion 171 side is displaced. Accordingly, it is possible to allow the first arm 11 to rotate with respect to the base 3, and to reduce occurrence of twist and fold of the wire 170 together with rotation thereof. Accordingly, damage in the wire 170 is reduced, and as a result, durability of the wire 170 can be improved.

Here, as in the present embodiment, the wire 170 includes the folded-back portion 171, and thereby, both the end portion (one end portion) of the folded-back portion 171 on the first arm 11 side and the end portion (the other end portion) on the base 3 side are located on the same side with respect to the drive unit 130. Furthermore, in the present embodiment, the end portion of the folded-back portion 171 on the first arm 11 side, the end portion on the base 3 side, the first arm 11, and the connector 33 are located on the same side with respect to the base 3. Accordingly, it is possible to reduce occurrence of twist or fold of the wire 170, and to easily connect the wire 170 and the connector 33 to each other. In addition, since a space for installing the wire 170 can be reduced so as not to cause twist and the like of the wire 170, a size of the base 3 can become relatively small.

Thus, it is possible to miniaturize the robot 1 and to save an installation space of the robot 1. Furthermore, since the base can be reduced in size, workability at the time of transporting and packing the robot 1 can be enhanced.

In the above description, the portion of the wire 170 located on the outer circumference of the drive unit 130 disposed on the base 3 and the first arm 11 is described as an example, but the wire 170 may have a folded-back portion in the same manner as the folded-back portion 171 also in a portion located on an outer circumference of the other drive unit 130. Thereby, occurrence of twist or fold in the entire wire 170 can be reduced, and thus, durability of the wire 170 can be improved.

In addition, the robot 1 may include, for example, a pipe (not illustrated) for transporting compressed air or the like, and the pipe may have a portion folded back in the same manner as the folded-back portion 171 of the wire 170.

Base Attachment Member

As illustrated in FIG. 11, the base attachment member 36 is provided under the portion 311 of the housing 31. In the present embodiment, the base attachment member 36 forms a circular shape surrounding an outer circumference of the portion 311. In addition, an outer shape of the base attachment member 36 when viewed from the axial direction of the first rotation axis O1 has a quadrangular shape. For example, abase attachment portion 361 configured by a screw hole for attaching the base 3 to the floor surface 710 is formed at each corner (end portion) of the rectangular base attachment member 36.

In addition, the base attachment portion 361 is disposed at the same distance from the first rotation axis O1 as viewed from a direction of the first rotation axis O1 and is disposed in the same circular circumference shape around the first rotation axis O1.

As such, the base 3 includes the plurality of base attachment portions 361 used for attaching the base 3 to the floor surface 710 (predetermined place). The plurality of base attachment portions 361 are disposed on the same circular circumference around the first rotation axis O1 (rotation axis). Thereby, the base 3 can be stably attached to the floor surface 710, and since the first arm 11 interferes a peripheral device or the like, in a case where an installation direction of the first arm 11 is not intended to change, the base 3 is changed around the first rotation axis O1, and thereby, it is possible to easily change the installation direction of the first arm 11 without changing a layout of the peripheral device.

The number, disposition, and the like of the base attachment portions 361 are not limited to those illustrated in the drawing. For example, the number of base attachment portions 361 is four in the present embodiment, but may be one, two, three, five or more. In addition, the plurality of base attachment portions 361 may not be arranged in a concentric shape. In addition, a structure of the base attachment portion 361 is not limited to a screw hole.

Engagement Member Attachment Portion

Next, an engagement member attachment portion 180 will be described.

Figure 12:
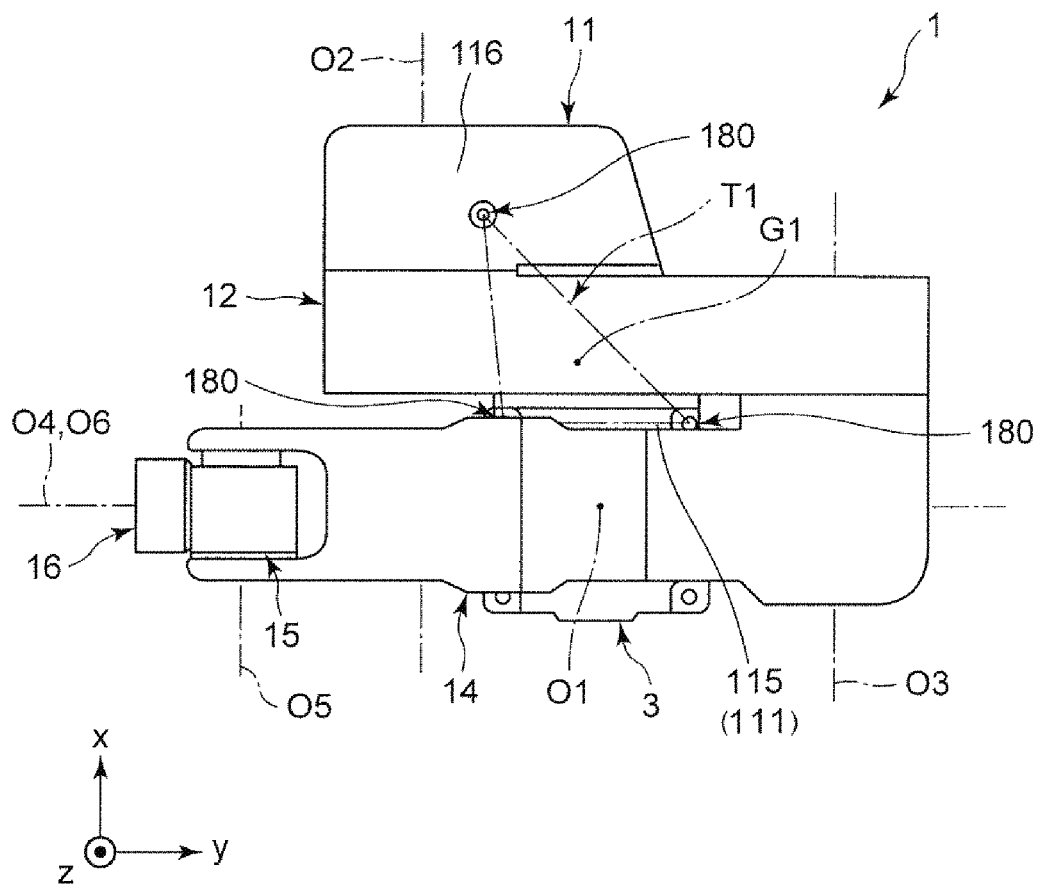
FIG. 12 is a schematic top view illustrating positions of a plurality of engagement member attachment portions.
Figure 13:
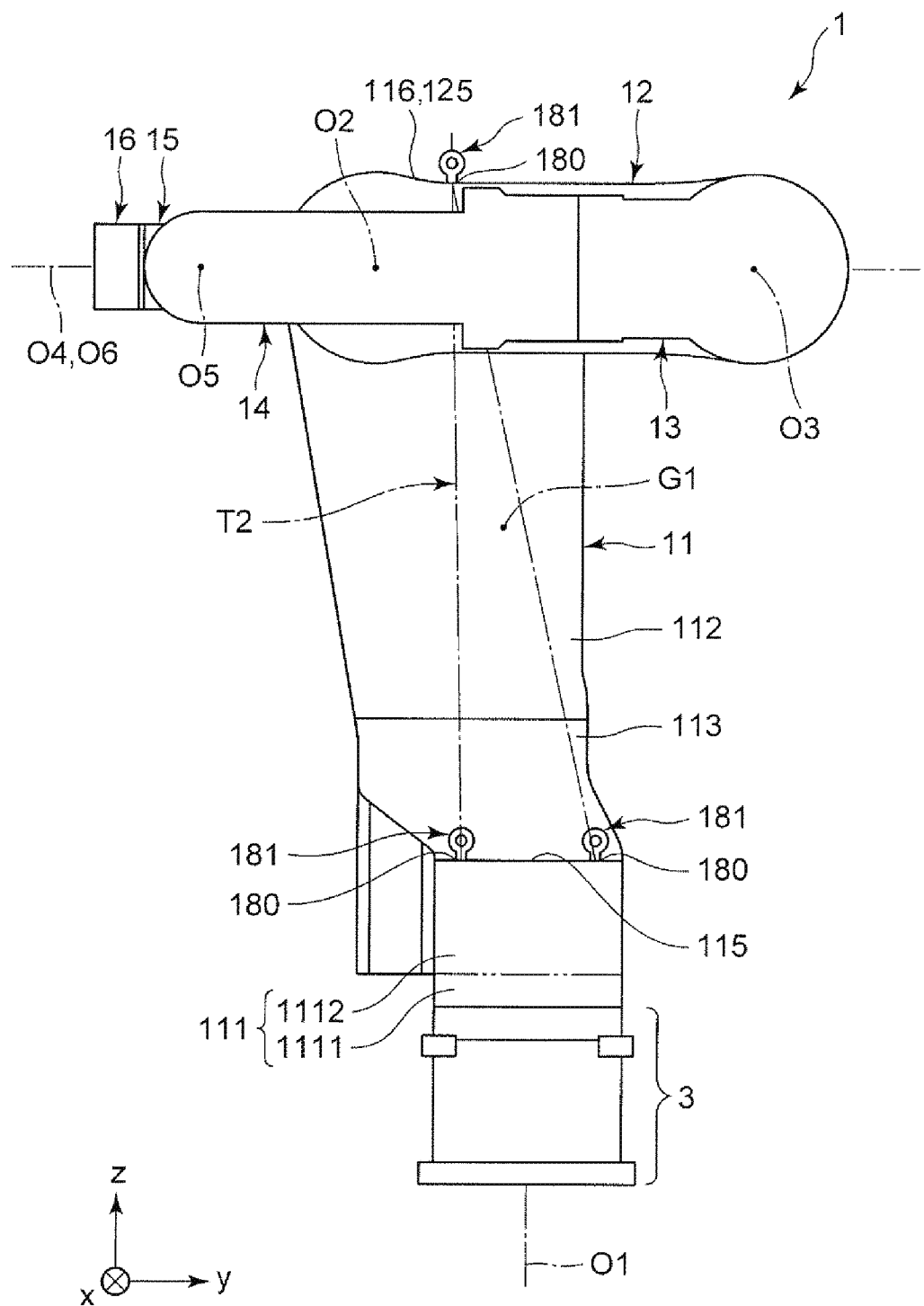
FIG. 13 is a schematic side view illustrating the positions of the plurality of engagement member attachment portions.
Figure 14:
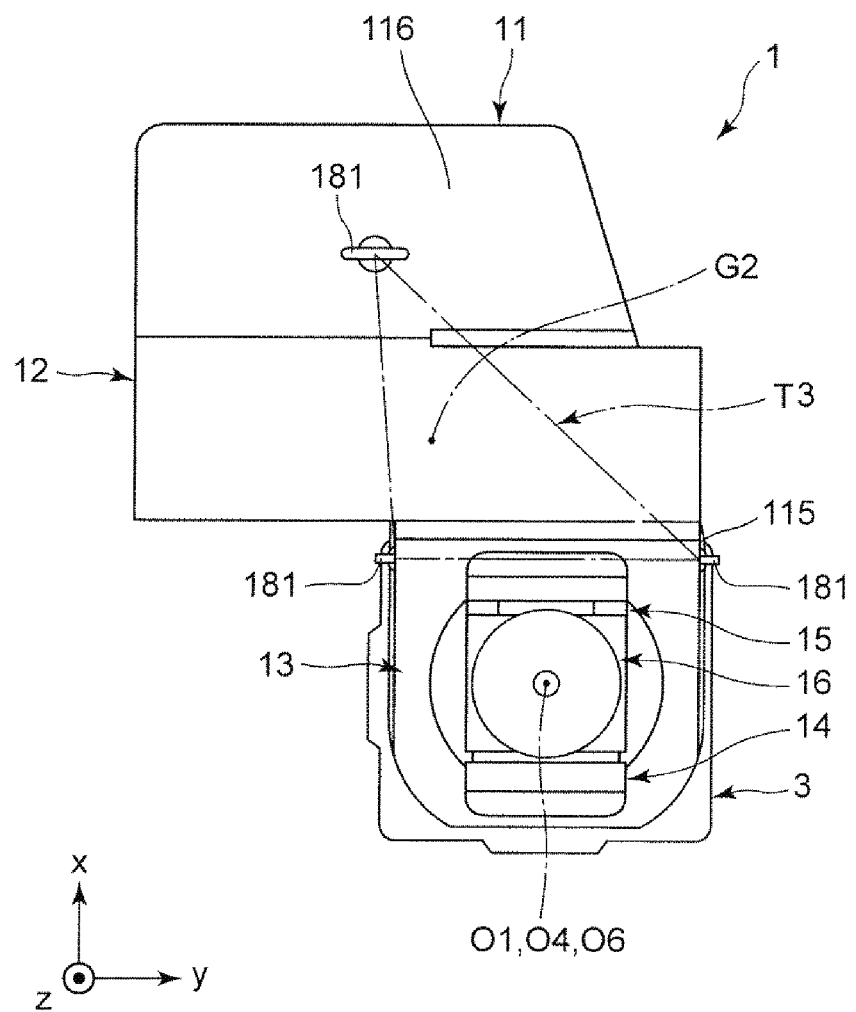
FIG. 14 is a schematic top view illustrating the positions of the plurality of engagement member attachment portions.
Figure 15:
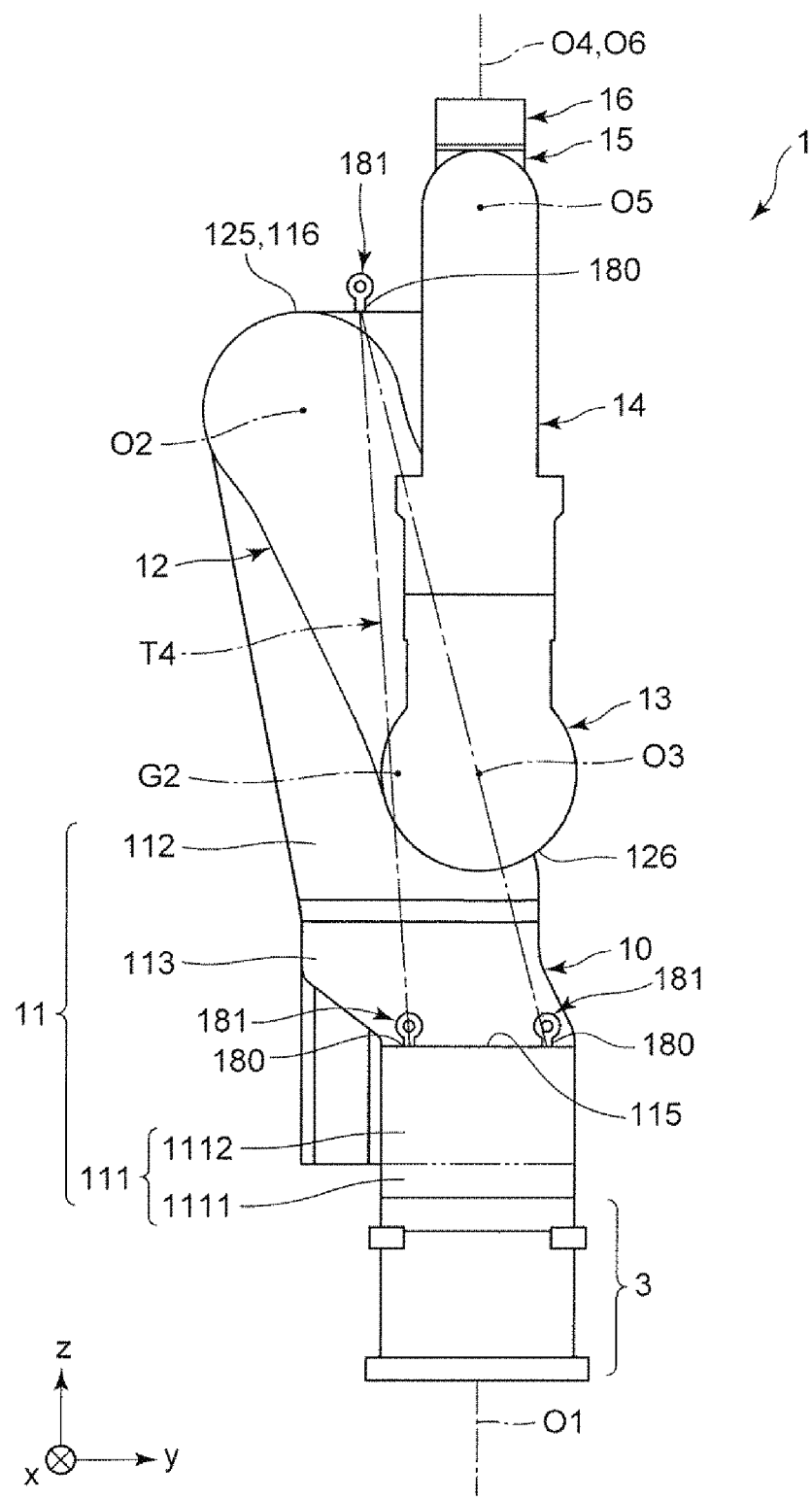
FIG. 15 is a schematic side view illustrating the positions of the plurality of engagement member attachment portions.

FIG. 12 is a schematic top view illustrating locations of a plurality of engagement member attachment portions. FIG. 13 is a schematic side view illustrating the locations of the plurality of engagement member attachment portions. FIG. 14 is a schematic top view illustrating the locations of the plurality of engagement member attachment portions. FIG. 15 is a schematic side view illustrating the locations of the plurality of engagement member attachment portions. FIG.

14 is a top view of the robot 1 in the posture illustrated in FIG. 4, and FIG. 15 is a side view of the robot 1 in the posture illustrated in FIG. 4.

The robot arm 10 includes a plurality of (three in the present embodiment) engagement member attachment portions 180 used for lifting and transporting the robot 1 (see FIGS. 1 and 12). Two engagement member attachment portions 180 of the three engagement member attachment portions 180 are provided on an upper surface 115 of the first portion 111 of the first arm 11. In addition, the remaining one engagement member attachment portion 180 is provided on a front end surface 116 of the first arm 11.

For example, the engagement member attachment portion 180 is configured by a female screw hole that can be screwed with an eyebolt 181 (engagement members) used for lifting the robot 1 (see FIG. 13). The eyebolt 181 is configured to be able to pass through, for example, a wire rope (not illustrated) and the like. Accordingly, a worker can lift the robot 1 by using the wire rope (not illustrated). Thereby, the robot 1 can be transported in a lifted state.

In addition, as described above, the robot arm 10 includes three or more engagement member attachment portions 180 that can attach the eyebolts 181 (engagement members), three in the present embodiment. Thereby, the robot 1 can be lifted in a well-balanced manner by using the eyebolt 181 and the wire rope (not illustrated). Accordingly, it is possible to further enhance workability in transportation of the robot 1.

In addition, as described above, in the robot 1, the center of gravity G1 of the robot 1 is located outside the base 3 as viewed from the axial direction of the first rotation axis O1 due to a configuration of the first arm 11. In the robot 1 having such a configuration, the engagement member attachment portion 180 is provided in the robot arm 10 rather than the base 3 in particular, and thus, it is possible to lift the robot 1 with a good balance by using the eyebolt 181 and the wire rope (not illustrated).

In addition, as illustrated in FIG. 12, the center of gravity G1 when the robot arm 10 is in the basic posture is located inside a shape connecting three or more (three in the present embodiment) engagement member attachment portions 180, a triangle T1 in the present embodiment as viewed from the axial direction of the first rotation axis O1. In other words, it is preferable to set the location of the engagement member attachment portion 180 such that the center of gravity G1 is located inside the shape (triangle T1) formed by connecting the plurality of engagement member attachment portions 180. Thereby, it is possible to lift the robot 1 in a particularly well-balanced manner by using the eyebolt 181.

In addition, as illustrated in FIG. 13, the center of gravity G1 is located inside a triangle T2 formed by connecting the three engagement member attachment portions 180 as viewed from the axial direction of the second rotation axis O2 (rotation axis).

As such, as viewed from a direction of the first rotation axis O1 and a direction of the second rotation axis O2, the center of gravity G1 is located inside the shape (triangle T1 or T2) formed by connecting the plurality of engagement member attachment portions 180, and thus, the robot 1 can be lifted in a more well-balanced manner.

In addition, the center of gravity G2 when the robot arm 10 is in the posture (second posture) illustrated in FIG. 14 is located inside the triangle T3 formed by connecting the three engagement member attachment portions 180 as viewed from the first rotation axis O1. In addition, the center of gravity G2 when the robot arm 10 is in the posture (second posture) illustrated in FIG. 15 is located inside a triangle T4 formed by connecting the three engagement member attachment portions 180 as viewed from the second rotation axis O2. Here, the posture (second posture) of the robot arm 10 illustrated in FIGS. 14 and 15 is a posture of the robot arm 10 when the center of gravity G2 of the robot 1 is located closest to the base 3.

As such, when viewed from the direction of the first rotation axis O1 and the direction of the second rotation axis O2 in each of the first posture and the second posture, the centers of gravity G1 and G2 are located inside the shape (triangles T1 to T4) formed by connecting the plurality of engagement member attachment portions 180, and thus, it is possible to lift the robot 1 in a particularly well-balanced manner.

The number of engagement member attachment portions 180 is three in the present embodiment, but may be two or may be four or more. In addition, the engagement member attachment portion 180 may be provided on the base 3 as necessary.

Illumination Unit

Next, an illumination unit included in the robot 1 will be described.

Figure 16:
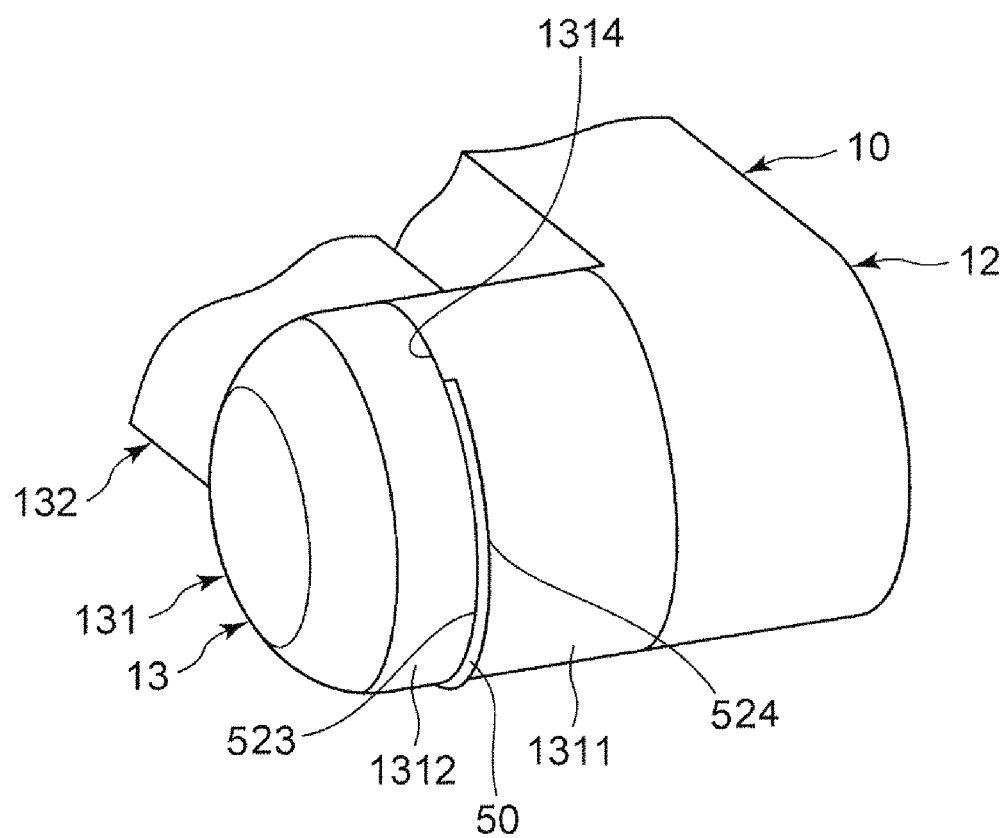
FIG. 16 is a view illustrating an illumination unit provided in the robot arm.
Figure 17:
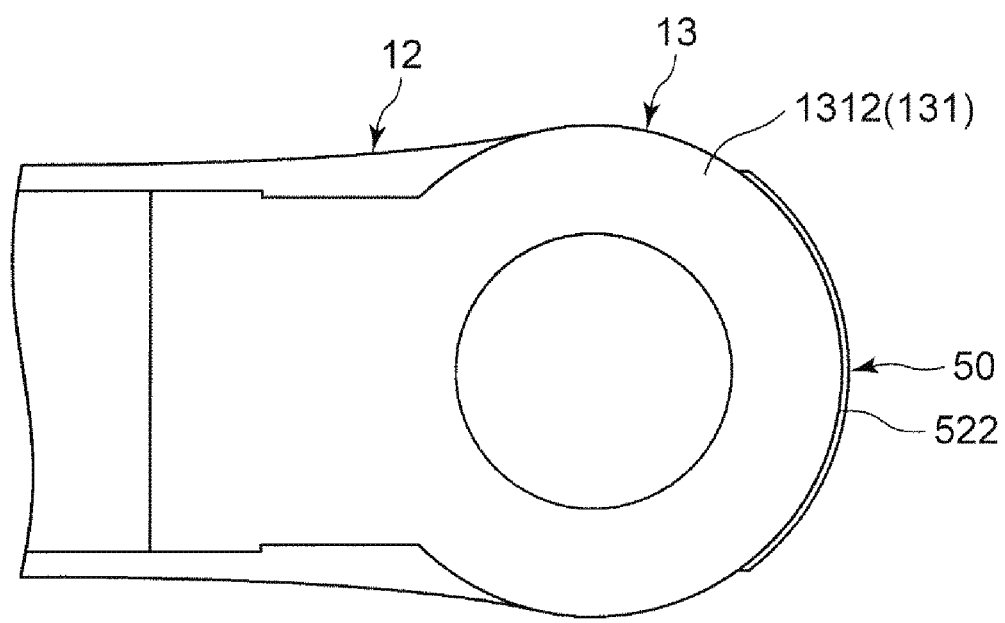
FIG. 17 is a view illustrating the illumination unit provided in the robot arm.
Figure 18:
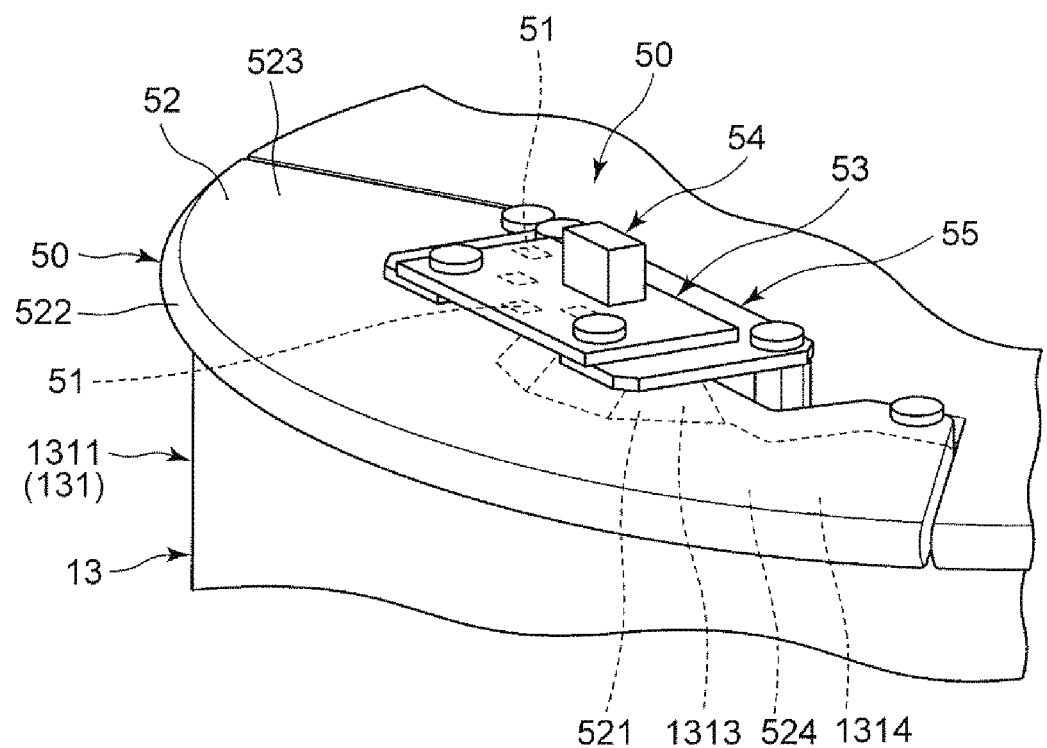
FIG. 18 is a perspective view illustrating the illumination unit.
Figure 19:
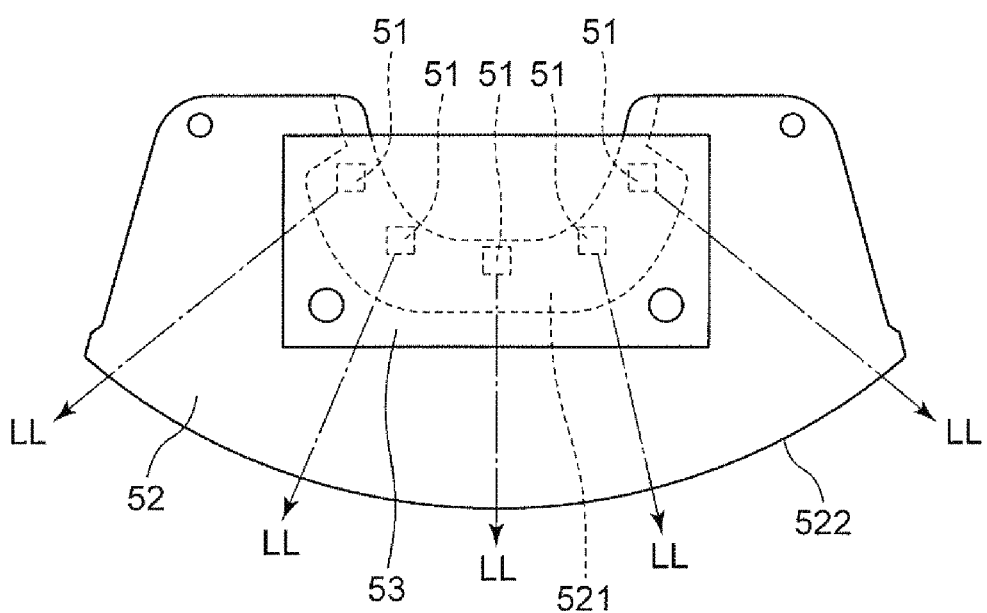
FIG. 19 is a plan view illustrating a light guide plate and a plurality of light emitting elements included in the illumination unit.
Figure 20:
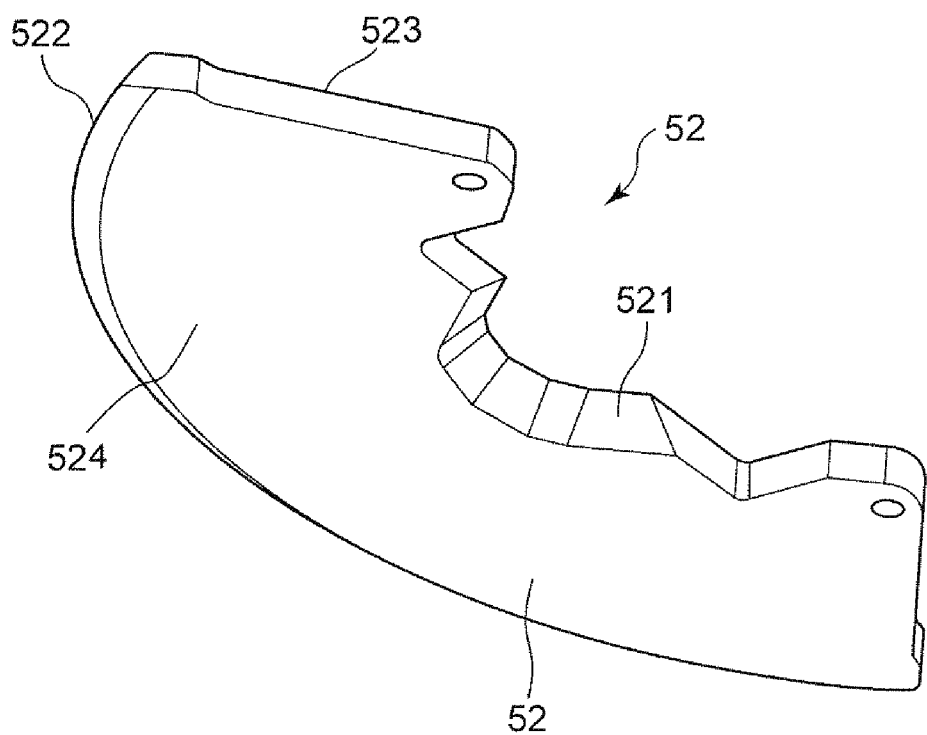
FIG. 20 is a perspective view illustrating the light guide plate included in the illumination unit.
Figure 21:
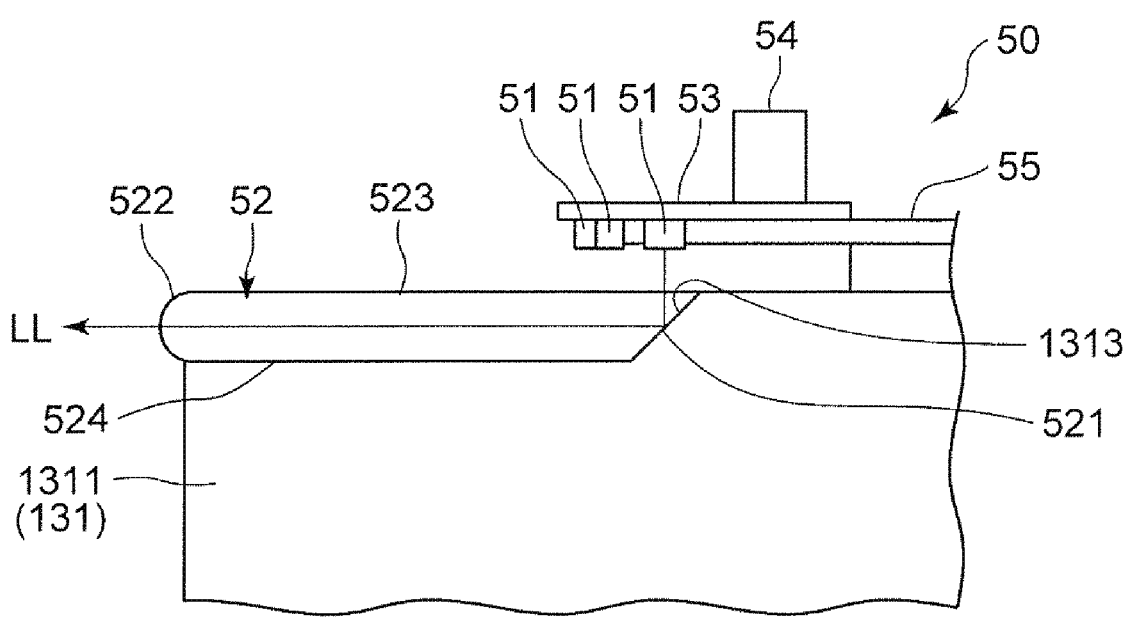
FIG. 21 is a diagram illustrating light emission performed by the illumination unit.

FIGS. 16 and 17 are views respectively illustrating the illumination unit provided in the robot arm. FIG. 18 is a perspective view illustrating the illumination unit. FIG. 18 illustrates a state where a cover member 1312 is removed. FIG. 19 is a plan view illustrating a light guide plate and a plurality of light emitting elements included in the illumination unit. FIG. 20 is a perspective view illustrating the light guide plate included in the illumination unit. FIG. 21 is a view illustrating light emission performed by the illumination unit.

An illumination unit 50 (light emitting unit) illustrated in FIGS. 16 and 17 has, for example, a function as a display lamp for notifying a worker that the robot 1 is in an operable state, that is, a state where the robot 1 is powered on.

As illustrated in FIGS. 16 and 17, the illumination unit 50 is provided in a portion 131 of the third arm 13 in the present embodiment. Here, as illustrated in FIG. 16, the portion 131 of the third arm 13 includes a main body portion 1311 connected to the second arm 12 and a cover member 1312 attached to the main body portion 1311. The illumination unit 50 is provided between the main body portion 1311 and the cover member 1312. In addition, as illustrated in FIG. 16, the illumination unit is disposed on a surface 1314 of the main body portion 1311 on a side opposite to the second arm 12.

As illustrated in FIG. 18, the illumination unit 50 includes a substrate 53 including a plurality (five in the present embodiment) of light emitting elements 51, a support member 55 connecting the substrate 53 to the main body portion 1311, and a light guide plate 52 provided under the plurality of light emitting elements 51.

Substrate Including Light Emitting Element

The substrate 53 including the plurality of light emitting elements 51 is fixed to the support member 55 by, for example, a clamp screw or the like. In addition, the light emitting element 51 supported by the substrate 53 is, for example, an LED or the like, and is disposed on a lower side of the substrate 53 so as to emit light toward the light guide plate 52. In addition, as illustrated in FIG. 19, the plurality of light emitting elements 51 are arranged in an arch shape as viewed from a thickness direction of the substrate 53.

In addition, the substrate 53 includes a plurality of wiring patterns (not illustrated) electrically connected to the plurality of light emitting elements 51, and a connector 54 for being electrically connected to a robot control device (not illustrated) via each wire or the like is provided on an upper portion of the substrate 53. Thereby, the plurality of light emitting elements 51 are electrically connected to the robot control device via the wiring pattern and the connector 54 provided on the substrate 53 and are controlled by the robot control device.

Support Member

As illustrated in FIG. 18, the support member 55 supports the substrate 53 with respect to the main body portion 1311. The support member 55 is configured by a member of a flat plate shape that supports an outer peripheral portion of the substrate 53 and a plurality of pillars that fix the member to the main body portion 1311. The support member 55 supports the substrate 53 such that the light emitting element 51 is separated from the light guide plate 52. A configuration of the support member 55 is not limited to the illustrated configuration as long as the substrate 53 can be supported.

Light Guide Plate

The light guide plate 52 is a plate-shaped member having transmittance and has a function of guiding light LL emitted from the light emitting element 51 to the outside (FIGS. 18, 19, and 20). The light guide plate 52 is configured by, for example, a transparent or milky white resin member or a glass member. In addition, the light guide plate 52 is fixed to the main body portion 1311 by, for example, a clamp screw or the like.

As illustrated in FIG. 20, the light guide plate 52 includes two main surfaces 523 and 524, an inclined surface 521 of an arch shape, and a wall surface 522 located on a side opposite to the inclined surface 521.

One main surface 523 is in contact with the cover member 1312, and the other main surface 524 is in contact with the main body portion 1311 (see FIG. 16). In addition, as illustrated in FIG. 18, the inclined surface 521 has a shape corresponding to the inclined surface 1313 formed in the main body portion 1311 and is in contact with the inclined surface 1313. The inclined surface 521 may be separated from the inclined surface 1313. In addition, the wall surface 522 has an arch shape as viewed from a thickness direction of the light guide plate 52. In addition, a wall surface 522 is rounded. The wall surface 522 protrudes to the outside more than an outer circumferential surface of the third arm 13 in a state where the light guide plate 52 is attached to the third arm 13 (see FIG. 16).

According to the illumination unit 50 configured in this way, as illustrated in FIG. 21, the light LL from the light emitting element 51 is emitted toward the light guide plate 52, and the emitted light LL is reflected by the inclined surface 521 of the light guide plate 52 and is emitted in a direction parallel to the main surfaces 523 and 524. Thereby, a worker can visually recognize the light LL from the illumination unit 50.

As described above, the robot 1 includes the illumination unit 50 including the light guide plate 52 provided in the robot arm 10 and the light emitting element 51 that emits the light LL to the light guide plate 52. Thereby, it is possible to notify a worker, for example, that the robot 1 is in an operable state. Particularly, in the present embodiment, a part of the light guide plate 52 is provided so as to be exposed in an outer circumferential portion of the portion 131 of the third arm 13. The portion 131 of the third arm 13 is a portion which can be viewed from the outside even if the arms 11 to 16 configuring the robot arm 10 overlap each other. Therefore, the worker can easily and visually recognize the light LL emitted from the illumination unit 50, and, for example, the worker can easily grasp that the robot 1 is in an operable state.

If the worker can visually recognize the light LL from the illumination unit 50, the illumination unit 50 may be provided at a location other than the third arm 13, for example, the arms 11, 12, and 14 to 16.

Furthermore, as described above, the light guide plate 52 includes a portion (wall surface 522) protruding to the outside more than an outer surface of the robot arm 10. As such, a part of the light guide plate 52 is exposed, and thereby, visibility of the illumination unit 50 can be enhanced. Thus, it is possible for the worker to easily grasp, for example, that the robot 1 is in an operable state.

In addition, as described above, the plurality of light emitting elements 51 are arranged in an arch shape, and a planar shape of the light guide plate 52 is a fan shape. Therefore, according to the illumination unit 50, it is possible to emit the light LL in a wider range. Thus, a worker can easily and visually recognize the light LL from various directions.

In addition, as described above, in the robot arm 10, the third arm 13 includes the main body portion 1311 and the cover member 1312 detachably attached to the main body portion 1311, particularly in this embodiment. In addition, the illumination unit 50 is provided in the main body portion 1311. Thereby, it is possible to easily route the wire (including the wire 170) or the like of the illumination unit 50, and to easily attach the illumination unit 50 to the robot arm 10.

In the present embodiment, the illumination unit 50 is attached to the main body portion 1311, but may be attached to the cover member 1312.

Second Embodiment

Next, a second embodiment according to the invention will be described.

Figure 22:
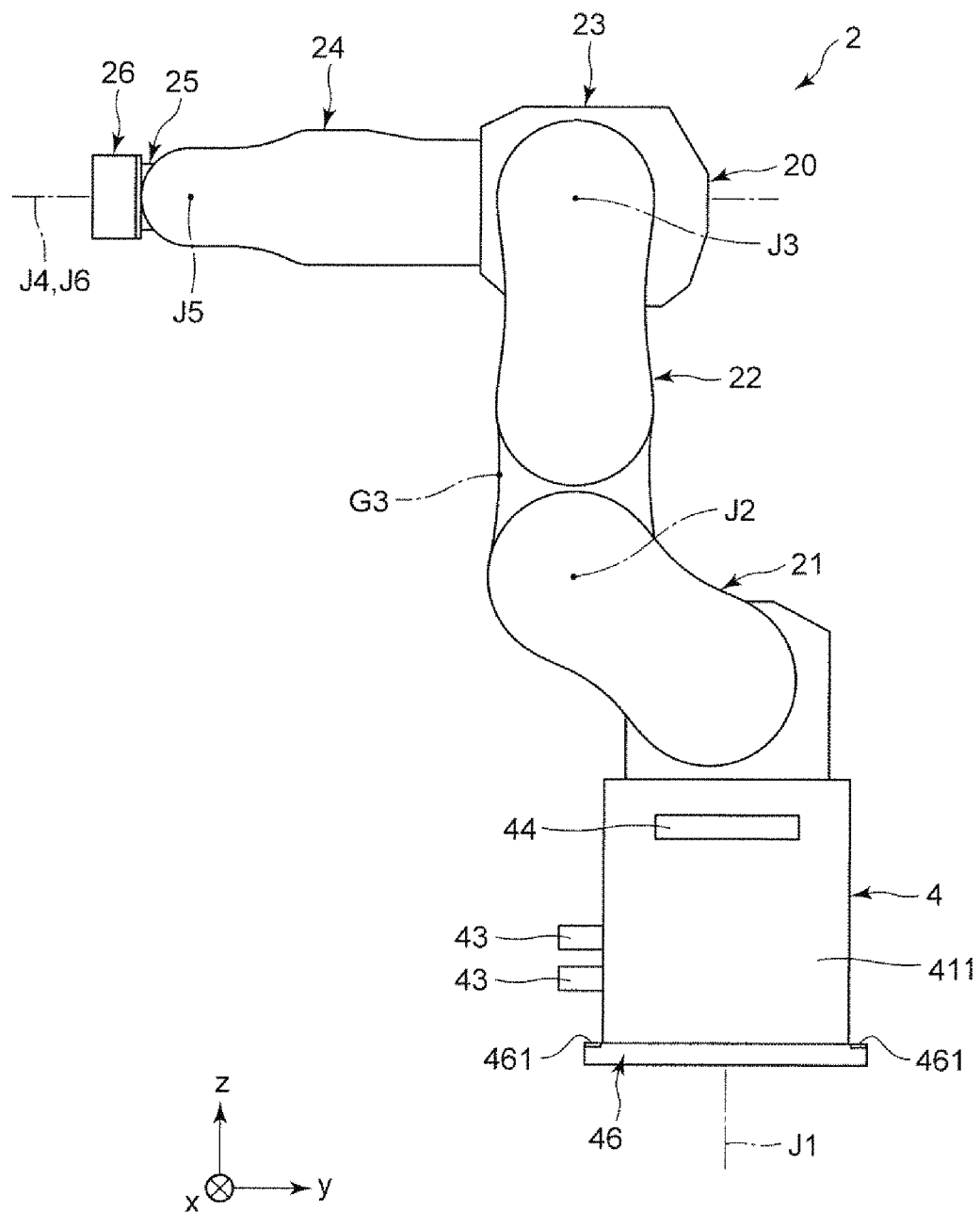
FIG. 22 is a side view illustrating a basic posture of a robot arm included in a robot according to a second embodiment.
Figure 23:
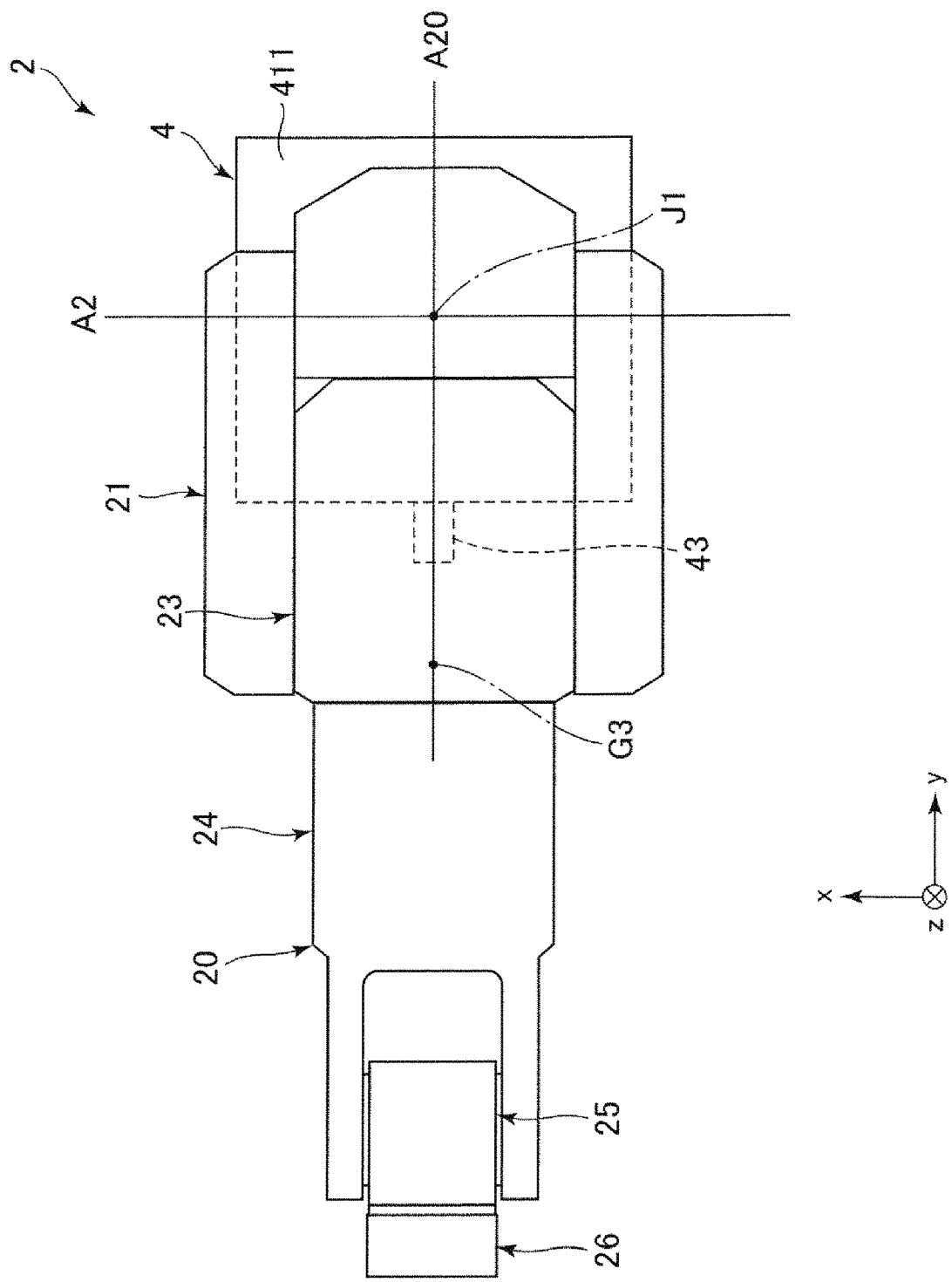
FIG. 23 is a schematic top view illustrating the basic posture of the robot arm included in the robot illustrated in FIG. 22.

FIG. 22 is a side view illustrating a basic posture of a robot arm included in a robot according to a second embodiment. FIG. 23 is a schematic top view illustrating the basic posture of the robot arm included in the robot illustrated in FIG. 22.

The present embodiment is the same as the above-described embodiment except that a configuration of the robot arm is different. In the following description, the second embodiment will be described by focusing on a difference from the above-described embodiment, and description on the same matter will be omitted.

A robot 2 illustrated in FIGS. 22 and 23 includes a base 4 and a robot arm 20.

The base 4 has the same configuration as in the base 3 according to the first embodiment, and includes a housing 411, a plurality of grip portion attaching portions 44, a plurality of connectors 43, and a base attachment member 46 including a plurality of base attachment portions 461.

The robot arm 20 has the same configuration except that configurations of the robot arm 10 and the first arm 21 are different from the configuration of the first arm 11 according to the first embodiment. Specifically, the robot arm 20 includes a first arm 21 (*arm*), a second arm 22 (*arm*), a third arm 23 (*arm*), a fourth arm 24 (*arm*), a fifth arm 25 (arm), and a sixth arm 26 (*arm*). The first arm 21 is rotatable around a first rotation axis J1 (rotation axis) in the vertical direction. In addition, the second arm 22 is rotatable around a second rotation axis J2 in the horizontal direction. In addition, the third arm 23 is rotatable around a third rotation axis J3 in the horizontal direction. In addition, the fourth arm 24 is rotatable around a fourth rotation axis J4 orthogonal to the third rotation axis J3. In addition, the fifth arm 25 is rotatable around a fifth rotation axis J5 orthogonal to the fourth rotation axis J4. In addition, the sixth arm 26 is rotatable around a sixth rotation axis J6 orthogonal to the fifth rotation axis J5.

In addition, unlike the first arm 11 according to the first embodiment, the first arm 21 according to the present embodiment has an elongated shape that does not have a bent or curved portion.

Also in the robot 2, the connector 43 (connection portion) is exposed on a side where the second arm 22 protrudes with respect to the base 4 when the robot arm 20 is in the basic posture, in the same manner as in the robot 1. In other words, as illustrated in FIG. 23, as viewed from an axial direction of the first rotation axis J1, the connector 43 is perpendicular to a location of the center of gravity G3 of the robot arm 20 when the robot arm 20 is in the basic posture and a line segment A20 passing through the first rotation axis J1, and is located on the center of gravity G3 side more than the line A2 passing through the first rotation axis J1. As such, since the first arm 21 and the connector 43 can be located on the same side with respect to the base 4, it is possible to enhance workability at the time of transporting and packing the robot 2 in the same manner as in the first embodiment.

The robot 2 described above also has the same characteristics as the first embodiment described above and can achieve the same effect.

As described above, although the robot according to the invention is described based on the illustrated embodiments, the invention is not limited to this, and the configuration of each unit can be replaced with any configuration having the same function. In addition, any other configuration may be added to the invention. In addition, the respective embodiments may be appropriately combined with each other.

The entire disclosure of Japanese Patent Application No. 2017-092640, filed May 8, 2017 is expressly incorporated by reference herein.

What is claimed is:

1. A robot comprising:
   a base;
   a robot arm that includes an arm which is rotatable around a rotation axis with respect to the base, wherein the robot arm includes three or more engagement member attachments to which an engagement member is attachable; and
   a connector that is provided in the base and is capable of being connected to an external wire,
   wherein a distance between the connector and an axis through a center of gravity of the robot arm is than a distance between the rotation axis and the axis through the center of gravity, as viewed from an axial direction of the rotation axis, and
   wherein, when the three or more engagement members are connected to form a shape when viewed from the axial direction of the rotation axis, the center of gravity is located within a boundary of the shape.

2. The robot according to claim 1,
   wherein the arm includes a first arm segment that is connected to the base so as to protrude from the base as viewed from the axial direction of the rotation axis, and a second arm segment that intersects with the first arm segment.

3. The robot according to claim 1, further comprising:
   a motor that is disposed inside at least one of the arm and the base and drives the arm; and
   a wire that is disposed inside at least one of the arm and the base, and is electrically connected to the motor,
   wherein the wire includes a folded-back portion that is folded back on an outer circumference of the motor.

4. The robot according to claim 1,
   wherein the base includes a grip attachment to which a grip is attachable.

5. The robot according to claim 1,
   wherein the base includes a plurality of base attachments configured to attach the base to a surface, and
   wherein the plurality of base attachments are arranged on a same circumference around the rotation axis.

6. The robot according to claim 1, further comprising:
   an illuminator that includes a light guide plate and a light emitting element, the light guide plate being provided in the robot arm and the light emitting element being configured to emit light to the light guide plate.

7. The robot according to claim 6,
   wherein the light guide plate includes a protrusion that protrudes away from an outer surface of the robot arm.

8. The robot according to claim 6,
   wherein the robot arm includes a main body and a cover that is detachably attached to the main body, and
   wherein the illuminator is provided in the main body.

9. A robot comprising:
   a base;
   a robot arm that includes an arm which is rotatable around a rotation axis and is provided on the base so as to protrude from the base as viewed from an axial direction of the rotation axis, the robot arm including three or more engagement member attachments to which an engagement member is attachable;
   a motor that is provided inside at least one of the arm and the base and drives the arm;
   a wire that is electrically connected to the motor and is disposed inside the base; and
   a connector that is electrically connected to the wire, is connectable to an external wire, and is exposed on an outer surface of the base,
   wherein the connector is exposed on a side where the arm protrudes with respect to the base as viewed from the axial direction of the rotation axis, when the robot arm is in a basic posture,
   wherein, when the three or more engagement members are connected to form a shape when viewed from the axial direction of the rotation axis, a center of gravity of the robot arm is located within a boundary of the shape.

10. The robot according to claim 9,
    wherein the arm includes a first arm segment that is connected to the base so as to protrude from the base as viewed from the axial direction of the rotation axis, and a second arm segment that intersects with the first arm segment.

11. The robot according to claim 9,
    wherein the wire includes a folded-back portion that is folded back on an outer circumference of the motor.

12. The robot according to claim 9,
    wherein the base includes a grip attachment to which a grip is attachable.

13. The robot according to claim 9,
    wherein the base includes a plurality of base attachments configured to attach the base to a surface, and
    wherein the plurality of base attachments are arranged on a same circumference around the rotation axis.

14. The robot according to claim 9, further comprising:
    an illuminator that includes a light guide plate and a light emitting element, the light guide plate being provided in the robot arm and the light emitting element being configured to emit light to the light guide plate.

15. The robot according to claim 14,
wherein the light guide plate includes a protrusion that protrudes away from an outer surface of the robot arm.

16. The robot according to claim 15,
wherein the robot arm includes a main body and a cover that is detachably attached to the main body, and
wherein the illuminator is provided in the main body.

17. The robot according to claim 14,
wherein the robot arm includes a main body and a cover that is detachably attached to the main body, and
wherein the illuminator is provided in the main body.

* * * * *